Jan. 27, 1953

E. L. RANSEEN 2,626,747

CENTRIFUGAL SEPARATOR

Filed March 11, 1949

INVENTOR.
Emil L. Ranseen,
BY
Atty.

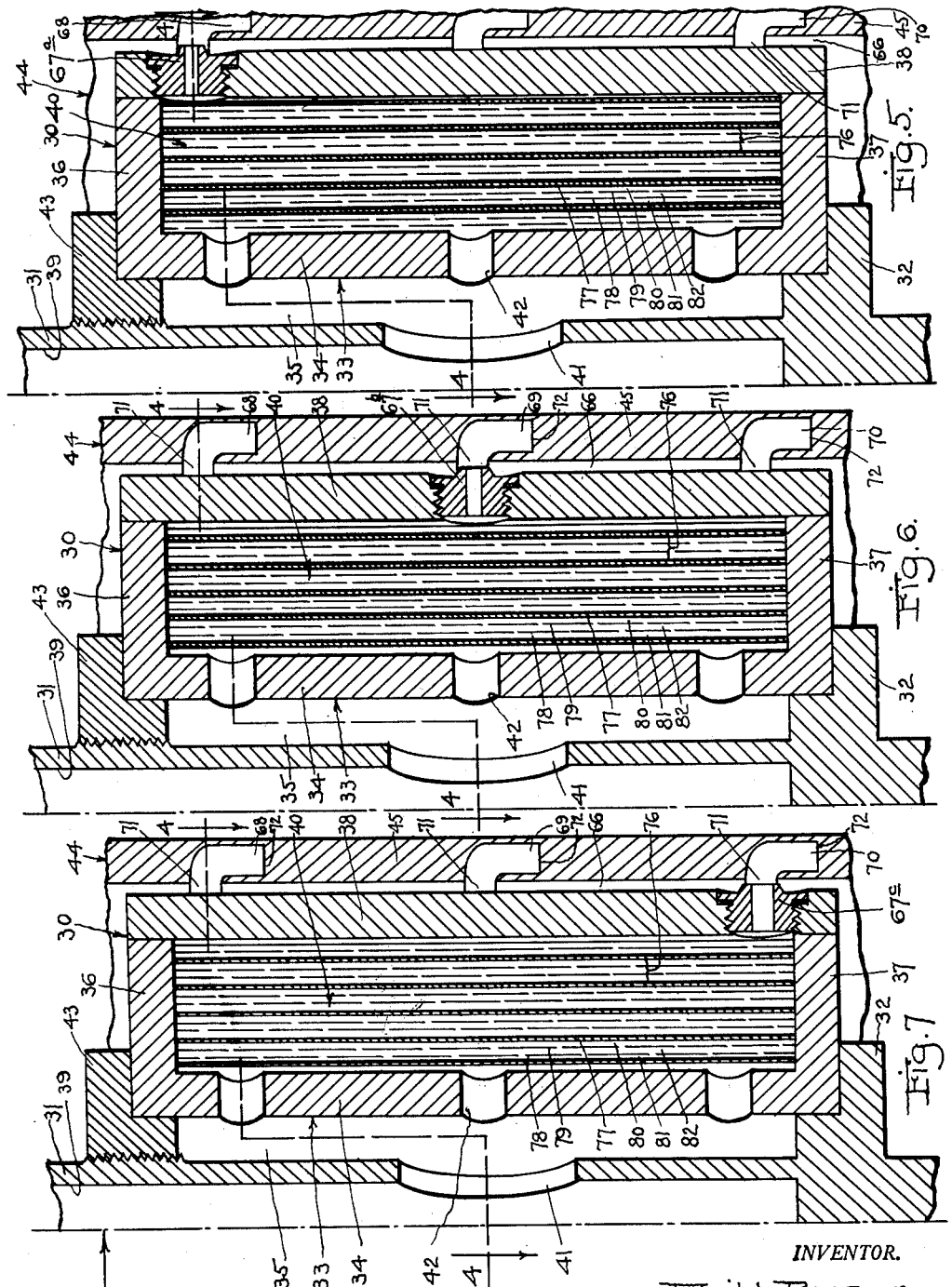

Jan. 27, 1953 — E. L. RANSEEN — 2,626,747
CENTRIFUGAL SEPARATOR
Filed March 11, 1949 — 12 Sheets—Sheet 7

INVENTOR.
Emil L. Ranseen,
BY
ATTY.

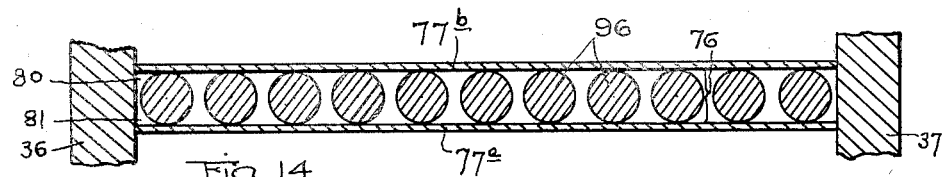
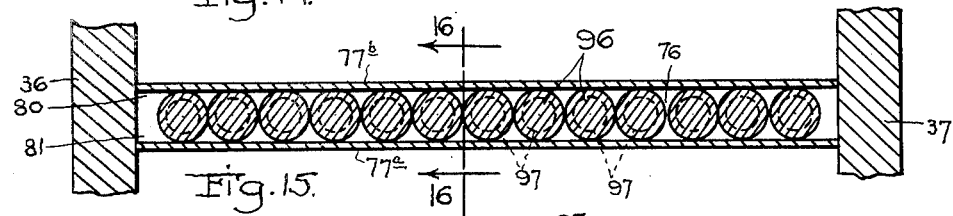
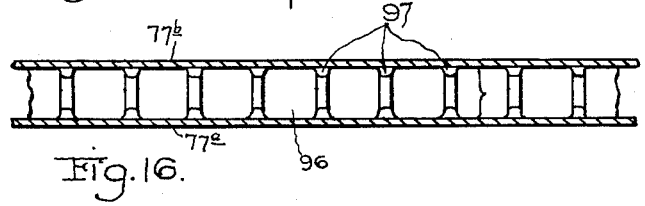
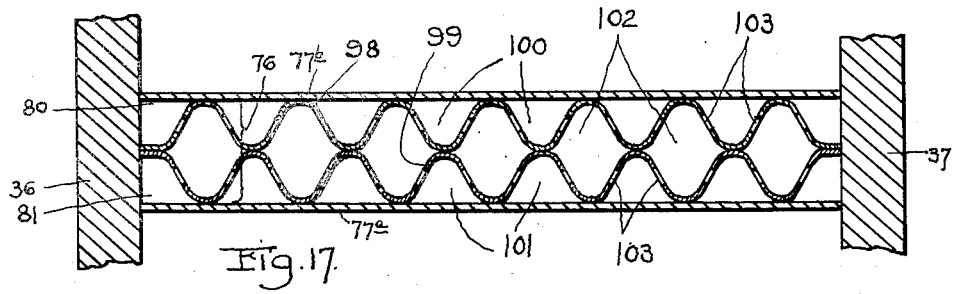
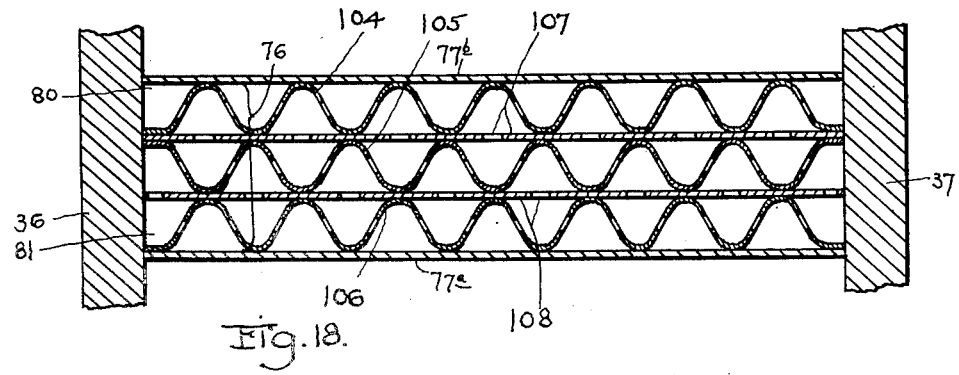

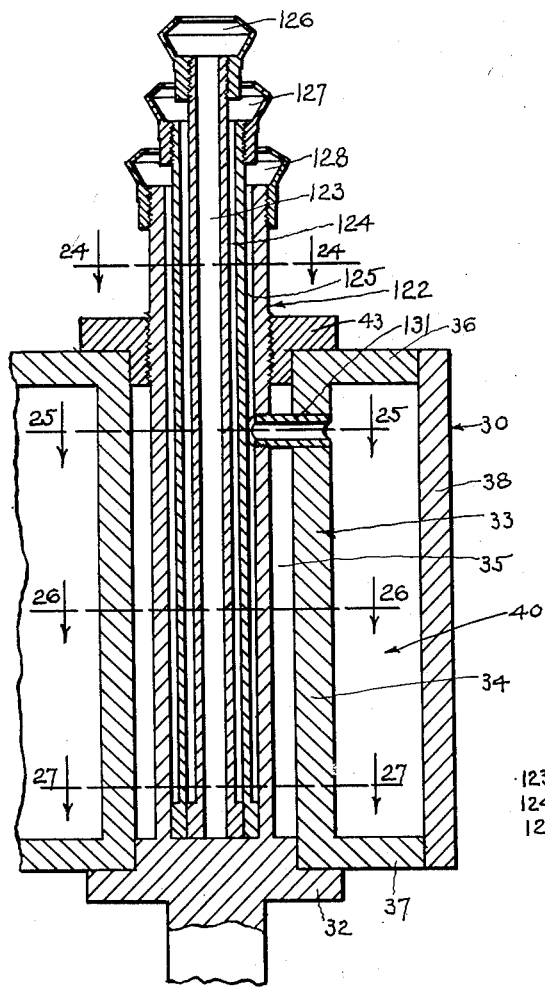
Fig. 23.
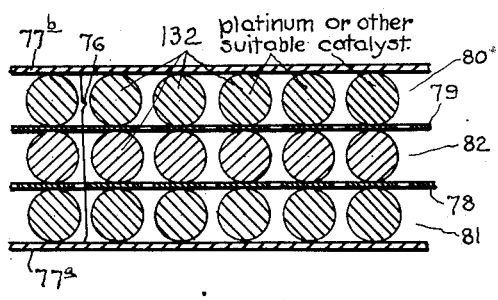
Fig. 28.
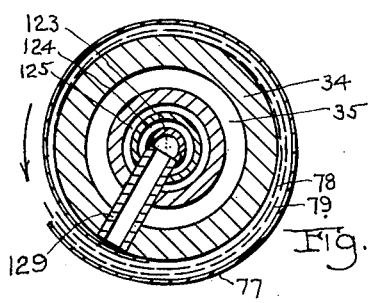

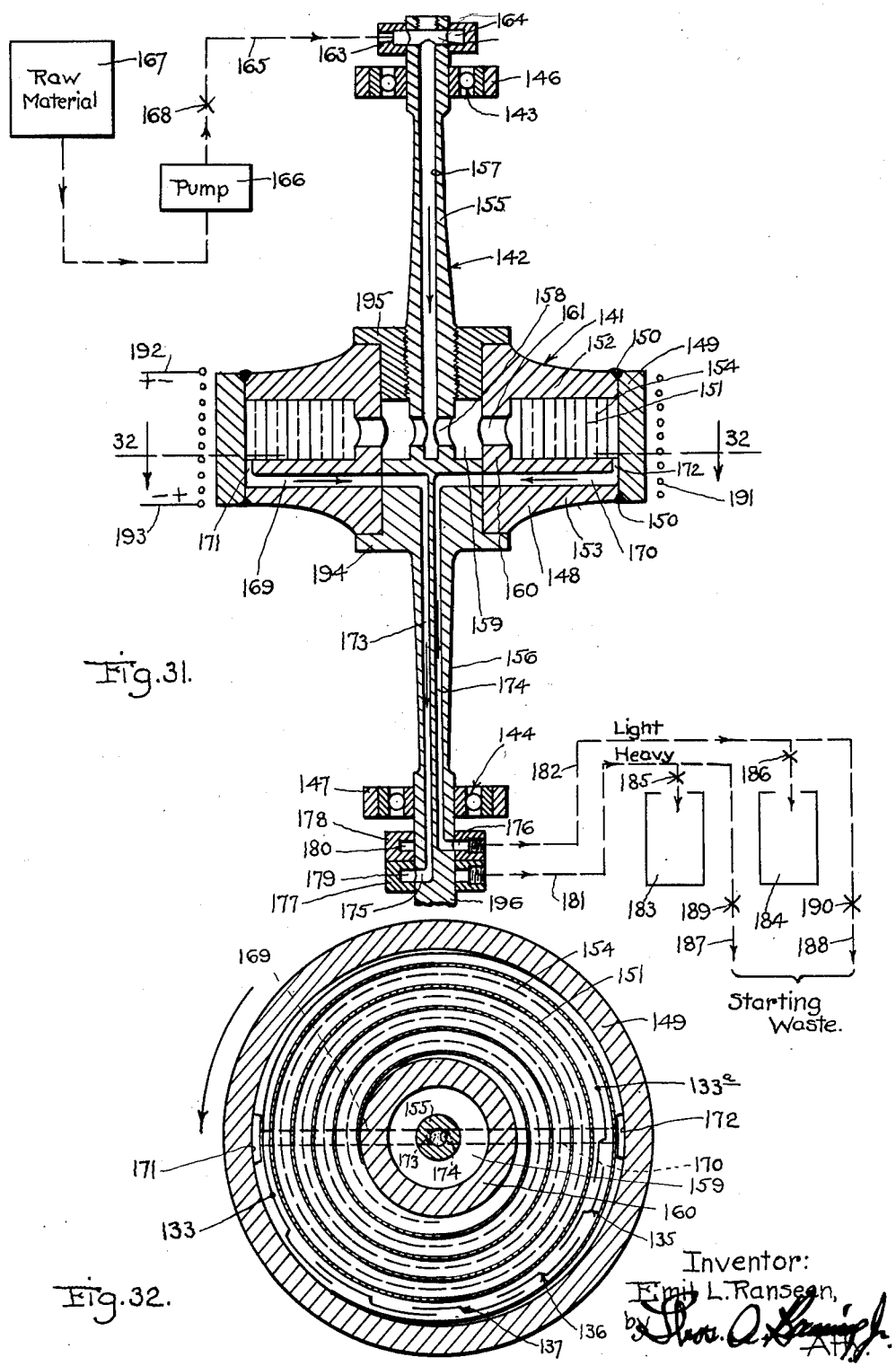

Patented Jan. 27, 1953

2,626,747

UNITED STATES PATENT OFFICE 2,626,747

CENTRIFUGAL SEPARATOR

Emil L. Ranseen, Chicago, Ill.

Application March 11, 1949, Serial No. 80,950

18 Claims. (Cl. 233—30)

This invention relates to improvements in centrifugal separators, and the like. In its broader aspects the invention relates to centrifugal separators intended for the separation of mixtures into their several components according to their specific gravities, but I have also herein disclosed means for bringing together two or more components which may react chemically with each other, producing end-products comprising a mixture of two or more liquids of differing specific gravities, which end-products are at the same time, and by means of the same mechanism, separated into their relative specific gravitational components.

The conventional form of centrifugal separator depends for its separating action on the difference between the specific gravities of the several components to be separated. When a mixture of two or more fluids, generally liquids, having different specific gravities is subjected to rotational operation there is developed in each of the particles of such mixture a centrifugal force which is proportional to the angular acceleration to which such particle is subjected multiplied by the specific gravity of such particle. If the mixture of such particles is contained within a container wherein the particles are completely free to move about without restraint (except such restraint as is imposed by the viscosity of the mixture, and internal attractions between the several particles), the several centrifugal forces developed in the particles will tend to cause all of the particles to crowd towards the point or zone where the maximum centrifugal force is being developed. This will be the point or zone of maximum diameter. But the force actually developed by each particle will depend also on its mass, so that the particles of heaviest material or greatest specific gravity will have generated within them the greatest forces. Assuming that the mixture is one having zero viscosity and zero interattraction between the particles of which it is composed, and assuming that there is zero internal friction within the mixture, those particles having the greatest centrifugal forces developed within them will crowd the particles of lesser centrifugal forces backwardly to positions of less radius, so that there will be developed zones of particles of different specific gravities. The particles of highest specific gravity will find their way to the zone of greatest radius, and the particles of lowest specific gravity will be forced to the zone of smallest radius, and particles of intermediate specific gravities will be forced to intermediate positions rated according to their several specific gravities.

All fluid bodies are possessed of viscosity and internal friction, and also to a greater or less degree are possessed of attractions between the particles of which they are composed. Due to these facts the separating action produced within the mass of such a complex body or mixture when it is subjected to centrifugal action, is not instantaneous, but requires the lapse of an appreciable time interval. The size of this time interval also depends on the physical distance by which the particles must be actually moved within the centrifugal separator in order to effect the complete and final separation. This time interval must be considered and properly evaluated in designing a separator intended for a specific use and with specified materials.

While centrifugal separators incorporating the features of the present invention may be used for separating the components of various kinds of mixtures, and for various kinds of commercial and other operations, at this point I wish to state that one important object of the invention is to provide a form and construction of separator which is well adapted for separating operations wherein it is desired to secure a high degree of certainty and accuracy in separating components having relatively close specific gravities, and for separating operations wherein the separating forces must be continued for a substantial interval of time in order to secure the desired end results. When the separating operation is produced in what is known as a "batch" type separator it is possible to maintain the centrifugal action over a considerable time interval, sufficient to bring about the desired separation even when the components are of relative close values of specific gravity, and when the viscosity and other factors opposing the separating action are substantial in amount. In such cases large time intervals are required, and the batch type of separator lends itself well to the production of the desired end results. However the batch type of separator is subject to the serious objection that it requires relatively expensive equipment, considering the daily capacity of an installation of given size, and is relatively slow in operation, and the labor cost of operations conducted with such equipment is high. Furthermore, many operations cannot be conducted with such batch type of separators for other well understood reasons.

Specifically the present invention concerns itself with a "continuous" or flow type of separator which is capable of producing many forms and kinds of separations, and with many mixtures of components which have heretofore required the use of batch type separators for their successful operation. The separators herein disclosed are so designed and built that the materials undergoing separation by centrifugal operation are nevertheless subjected to the centrifugal forces for an extended time interval and while moving or flowing continuously from the point of inflow of the original mixture into the centrifugal zone, until the separated components are finally delivered from the centrifugal zone as distinct streams or bodies of separated components. Thus the separators herein disclosed present the advantages inherent in the use of an extended time interval combined with the advantages inherent in continuous flow type separators as distinguished from batch type separators. Many kinds of mixtures which have heretofore not been susceptible of good separation in either or both of the types heretofore known and used can be successfully separated in the devices of the present invention, and without damage or deterioration to such mixtures or the several components of which they consist.

The separators herein disclosed lend themselves to the centrifugal separation of mixtures wherein it is desired to produce separation closely approximating molecular separation. Such molecular separation may be effected by heat treatments, as by vaporization or boiling off of the several constituents from a mixture of constituents having different boiling points. However, in many cases the application of heat to the mass is undesirable, or may even result in damage to or destruction of one or more of the constituents. This is especially true in the case of many medicinal and/or biological bodies, or operations involving medicinal or biological materials. Frequently the application of heat to one or more of the bodies contained in or comprising a portion of such mixtures is destructive thereof. No application of vaporizing heat to the mixture is necessary in conducting the operations herein disclosed.

Centrifugal separators embodying the features herein disclosed are well adapted to many operations, including refining operations, separation of oils of different specific gravities, separation of waxes, fats, and the like, from mixtures wherein they are contained, medicinal operations, biological operations, and generally in operations wherein it is desired to separate constituents of different specific gravities composing or contained within a mixture. Separators embodying the present features may also be used for the separation of gases of different specific gravities.

A further feature of the present invention relates to the carrying forward of various chemical operations wherein two or more chemically reactable constituents are brought together for reaction to produce two or more end products which are in turn to be separated. Frequently in such operations it is desirable to make provision for bringing about the reaction in question, and for immediately or very promptly thereafter ensuring the separation of the produced end products, so that said end products may not thereafter produce other reactions which are not desired.

It is a further object of the present invention to provide a form of device in which the several constituents which are to react together may be brought into the presence of each other for such reaction, within the separating zone, so that said constituents may react together in such zone, thus producing the end products of different specific gravities within such zone; and so that promptly after the production of such different specific gravity end products, said end products will be subjected to the separating action, by centrifugal operation. By this arrangement the time interval between the production of the end products and their centrifugal separation will be reduced to substantially such a small interval that little deterioration of such end products may occur, due to their proximity to each other; and also by this arrangement the inter-reaction of such end proudcts with each other, for the production of other or undesirable secondary end products will be minimized due to the fact that such end products of different specific gravities will be immediately or promptly separated from each other and before they have had opportunity to react together for production of such secondary products.

In connection with this feature of the invention, it is well known that catalysts are widely used for promotion or hastening such primary reactions for production of two or more end products of different specific gravities. It is a further feature of the present invention that such catalysts may be readily included within the space or spaces wherein the primary reactions are proceeding, thereby promoting such primary reactions, and effecting such reactions immediately prior to the locations where the centrifugal separations are proceeding within the same unit or device.

The production of the separating action due to centrifugal force within the mixture of bodies depends on generation of a centrifugal force within each particle of such mixture proportionate to the specific gravity of such particle multiplied by the rotative velocity to which it is subjected. The effective separation of the particles into classes of substantially equal specific gravity of each such class depends on the maintainance of th_s centrifugal force for a time interval sufficient to permit the movement of the different specific gravity classes into distinct zones, under the conditions of viscosity, mutual attraction, between the particles, etc. existing within the mixture being treated.

It is desirable to hold the rotor diameter to as small a value as possible consistent with the capacity of the separator unit volumes of material to be treated per unit axial length of the rotor. By holding down the diameter of the rotor the size and weight of the machine, as well as its cost, are correspondingly reduced. It is, however, desirable to use high rotative speeds so as to secure as large centrifugal forces as possible. It is also desirable to use arrangements which are consistent with the tensile and other strengths of the metals from which the rotor is built. It is also desirable to use arrangements such that the time interval during which the separating action may be continued is sufficiently large to cause the desired separations to occur. When I speak of high rotative speeds I have in mind such speeds as above twenty or thirty thousand or more revolutions per minute, and diameters of rotor of up to four to six inches, or greater. As better and better materials become available for the construction of such rotors these values, both of speeds and of sizes may be increased; but any benefits made available in the case of conventional forms of separators due to such improved materials will also be available in the case of separators incorporating my present improvements.

In such conventional forms of separator the actual time interval during which the particles are subjected to the centrifugal separating action is very small, and frequently is of the order of a fraction of a minute. Such very small time intervals are insufficient to effect separations of many materials having relatively large differences of specific gravities, not to speak of effecting separations when the specific gravities are relatively close together in values. Such conventional forms of separators are wholly incapable of effecting satisfactory separation of materials having relatively close values of specific gravities. Such conventional forms of separators are totally inadequate for effecting what may be called an approximation to "molecular" separations, such as are desired in many operations. The effectiveness of such conventional forms of separators for separating various specified materials is increased in the case of increased viscosity of such materials, or in the case of increased molecular attractions within such materials.

According to one principal feature of my present invention I provide a spirally formed and spirally extending passage from the axial inlet location where the mixture of components is introduced, to the periphery of the rotor, where the separated and distinct components are delivered from the rotor. This spirally extending passage is of relatively small radial dimension as compared to its spiralled length, and the spiralled length of this passage is many times the radius of the rotor. This spiralled passage is also preferably of substantial width as compared to the radius of the rotor, such width being made sufficient to provide such cross-sectional size of the passage as may be required depending on the capacity of the separator in gallons or other units of liquid volume per minute. The mixture of materials enters the inner or axial end of such passage and travels through the passage towards the periphery of the rotor. Therefore the material being treated must travel a length of path greatly in excess of the direct radial dimension of the rotor in order to reach the discharge point at the periphery of the rotor. Generally there will be provided several complete turns or convolutions in this spiral passage, for example, five, so that as compared to the direct radial dimension of the rotor the linear length of this spiral path may be thirty or forty or more times the radial dimension of the rotor. This means that the material while travelling at a given linear rate through the rotor will actually remain in the passage for a time interval thirty or forty times as great as would be the time interval needed for such material to travel from the axial inlet to the peripheral outlet in the case of a path of travel extending radially of the rotor instead of spirally thereof. The time during which the centrifugal action is effective on the materials being treated is proportionally increased, without increase of diameter of the rotor. Likewise for a given speed of rotation and with a given rotor diameter producing a given centrifugal action the time interval during which separation may occur will be increased thirty or forty fold. Consequently my improved separator may effect a much more complete separation of the components than is possible in the conventional form of separator, or separations of materials may be effected which have heretofore been beyond the range of separating possibility, or both of these benefits may be obtained simultaneously.

It is also noted that in my improved form of separator the spiral passage is defined and limited by a thin sheet of metal or other suitable material which is wound in spiral fashion between a pair of end walls which are axially spaced apart and generally constitute the upper and lower ends of a cylindrical rotor. The convolutions of this spirally wound sheet are separated from each other radially a distance which defines the radial dimension or thickness of such spiral passage. At any given point along its length such passage is defined by the opposing but separated faces of two consecutive convolutions of the spirally wound sheet. The inner or small radius face and the outer or larger radius face opposite thereto thus define the limits of radial movement of material which may occur within the passage at any given location along the spiral length of such passage. As the mixture being treated travels along the spiral passage towards the outer discharge end thereof said mixture is being constantly subjected to centrifugal action, and as such travel continues towards the discharge end of the spiral passage the radius of such passage as a whole continually increases since the outer or discharge end of the passage lies at the outer cylindrical surface of the cylindrical rotor.

During progress of the material through such spiral passage said material is being continually subjected to centrifugal action. Thus the heavier particles are being constantly driven towards the outer or larger radius face of the passage and the lighter particles are being constantly crowded towards the inner or smaller radius face of the passage. These two faces are only a small distance apart (measured radially at any location along the length of the passage), but the length of travel from inlet to outlet is very large, as already stated. Due to such small radial distance between the inner and outer faces of the passage it follows that only a small distance of movement of the heavy particles outwardly, and of the lighter particles inwardly, is needed in order to effect complete separation.

It is thus evident that I have, by the provision of my spiral passage construction produced an arrangement in which only a small movement of particles radially will effect complete separation of the heavier and lighter particles from each other, and I have done this in an arrangement in which the time interval during which the centrifugal action is maintained is very large (being the time needed for travel of the mass of material through the entire length of the spiral from the axial inlet to the outer cylindrical outlet). Both of these factors act together favorably to make possible a complete separating effect with very slow molecular movements of particles with respect to each other.

It is also noted that during the separating action the earlier increments of movement along the spiral passage will effect rapid separation since the constituents are completely mixed together when the operation commences at the inner or axial end of the passage. As the material progresses through the passage there remains less and less of the lighter material or constituent in that portion of material travelling along close to the outer face of the passage, and correspondingly less and less of the heavier material constituent in that portion of material travelling along close to the inner face of the passage. Therefore the separating action becomes slowed down, and greater and greater forces are needed to effect separation of the last portions of mixed material. In other words, it becomes necessary to subject the material to greater separating forces in order to effect the final and more complete separating actions, than were the forces originally acting on the material when initially introduced into the separating passage. It is however also seen that as the material progresses through the spiral passage the convolutions become continuously of larger radius, so that the centrifugal forces acting on the material which remains unseparated increases until the outer periphery of the rotor is reached.

It is also seen that when the spiral passage is of uniform cross-section throughout its spiralled length the material undergoing treatment will travel at a uniform linear speed along such passage. However, due to the spiral form of the passage the angular rate of movement of the material with respect to the body of the rotor will continually decrease since the radius of the spiral passage (measured from the axis of rotation of the rotor) continually increases. As the angular rate of movement along the spiral passage decreases the time intervals needed for the material to traverse successive equal increments of length of the passage increases. These successive equal increments of length of the passage are also of successively greater radii (measured from the axis of rotation). The centrifugal force developed on the material at any given position (namely, in any given increment of length of passage) increases as the value of the radius (all portions of the spiral passage making the same number of revolutions per minute). The "separating effectiveness" in any given increment of length of passage may be expressed as the centrifugal action existing in such increment multiplied by the time interval during which the material remains in such increment. In my improved form of separator the time intervals for successive increments of length of passage are increasing and also the centrifugal actions in said increments of passage are increasing. The product of these two increasing factors increases as a squared function. The result is that the 'effectiveness of separation" in the later stages of travel along the spiral passage increases very greatly. Such great increase occurs at the time when most needed, namely, when the pecentage of light material remaining in the separated heavy body is small and when the percentage of heavy material remaining in the separated light body is small. Due to the above favorable relationship it is possible to secure substantially complete separation even in the case of mixtures which stubbornly resist separation by centrifugal action. This fact will be emphasized by consideration of characteristic curves hereinafter.

As the separation proceeds the heaviest particles which have been separated will be forced to travel along adjacent to the inwardly facing, but larger radius face of the passage, and the lightest particles which have been separated will be forced to travel along adjacent to the outwardly facing, but smaller radius face of the passage. During the travel along such passage there will be proceeding a more or less continuous readjustment or repositioning of the various particles. This readjustment will include not only the actual separation movements (being a more or less radial movement within the passage), but also will include lateral movements of the particles within the relatively broad passage. Such lateral movements comprise movements of particles away from one end plate of the rotor and towards the other end plate of the rotor.

In case the original mixture includes components of more than two specific gravities it is evident that these several components will range themselves in zones within the spiral passage, such zones lying at consecutively greater radii from the axis of rotation. These zones will be more or less clearly defined depending on the amounts by which these several components differ from each other in specific gravity, the viscosity of the mixture and its several components, the molecular attractions between the several components, and other factors of the problem. As the separated particles approach and finally reach the discharge end of the passage they may be individually received by separate receiving passages or channels for the individual delivery thereof from the separator. The number of these passages or channels will of course depend on the number of components into which the separation is being effected.

At the very high rotative rates used in the separator there will be developed very high centrifugal forces. Such centrifugal forces will exist not only in the material undergoing treatment, but also in the sheet which is spirally wound and defines the passage. These forces may be of the order of 100,000 "G" or 200,000 "G" or much higher, depending largely on the strength of materials available and suitable for use in these separators. It is contemplated that this sheet will be of considerable length axially of the rotor, since the greater such length the greater the capacity of the separator, for a specified thickness or radial dimension of the radial passage. If the edges of such sheet be brazed or soldered or welded or otherwise connected to the end plates, still the central portions of the convolutions will tend to suffer displacement under the forces generated by the centrifugal action. Also, since it is contemplated that the spiral passage shall be of relatively small radial dimension or thickness (for example, a few hundredths or even a few thousandths of an inch), it is seen that very small displacements of the convolutions of the sheet from a truly spiral form will result in serious irregularities in the radial dimension of the passage at various points throughout its length.

I have provided spacers within the spirally extending passage which spacers shall serve among other things to retain the convolutions of the sheet at exact spacing even under the very great centrifugal forces developed during operation. These spacers together with the spirally wound impervious sheet or partition, provide a very rugged body between the upper and lower end plates. This rugged body is thus provided with the spirally extending passage extending from the inlet at the inner or axial end to the outlet at the peripheral or outer cylindrical surface end; and within the passage there are the reinforcements which serve to break up the passage into various sub-passages which interconnect with each other in such manner as to allow sufficient freedom of repositioning of the materials undergoing separation during their movement towards the outer discharge end of the passage.

These reinforcements within this passage may take the form of wires, foraminated plates or sheets, specially grooved sheets or the like, or other forms. Some of these are illustrated hereinafter. Between these reinforcements there may be left clear spaces; or in some cases the spaces between such reinforcements may be filled with such foraminous or pervious materials as glass wool, spun glass, fibrous materials, and various materials which are not affected chemically by the materials undergoing treatment.

When it is desired to additionally produce catalytic actions during the movements of the materials through the passage such catalytic materials may take the forms of the wires or foraminous sheets, or portions of them, by forming said wires or foraminous sheets of suitable material such as platinum, etc.

Referring again to the separating process which proceeds during the movement of the material along the spiral passage, it will be seen that at any given position along said passage the heavier material has gathered to a greater or less extent in proximity to the inwardly facing, outer wall of that passage, with the lighter material forced inwardly in proximity to the outwardly facing, inner wall of that passage. Such heavier material is then subjected to a further separating action (assuming that it is not completely separated but contains a relatively small percentage of the lighter material within its body). Then, as the body of material proceeds still further along the passage further separating action occurs, forcing still more of the remaining lighter components inwardly, and improving the perfection of the separation, so that the concentration of the heavier component which is in proximity to the outer wall of the passage increases, and so that likewise the concentration of the lighter component which is in proximity to the inner wall of the passage increases. Thus the separation action is progressive along the length of the spiral passage, with a continually improved degree of separation, and with a progressive approximation to complete or perfect production of heavier component undiluted with lighter component, and likewise a progressive approximation to complete or perfect production of lighter component undiluted with heavier component. It is intended that by the time the outer or delivery end of the spiral passage is reached the degree of separation shall have attained that approximation to perfection which is acceptable according to the standards of separation as predetermined.

A further object of the invention is, if desired, to provide within the spiral passage sub-partitions which shall serve to periodically isolate the already separated heavier component from the already separated lighter component, so that further intermingling of these separated components cannot occur at or in later increments of the length of the passage; and so that the centrifugal action to which such separated heavier component is subjected shall serve to effect a further refinement or purification of the heavier component, forcing inwardly additional portions of lighter component which have not previously been removed from the previously separated heavier component. By providing a number of such sub-partitions along the length of the spiral passage such "stage" separation may be repeated a corresponding number of times, within the body of the single rotor of a single separator. Such sub-partitions should, for this purpose be impervious, but discontinuous, as will be hereinafter illustrated and described.

For the treatment of certain materials, as for example various materials containing waxy ingredients, it is desirable to reduce the viscosity of the material being treated. This may be done by heating the material, but the amount of such heating is usually insufficient to produce any separating action by vaporization. Rather such heating is of a relatively low degree and is merely for the purpose of making possible certain separating actions to occur under centrifugal action, or to expedite such centrifugal separating actions. As a further feature of my present invention I have disclosed means to heat the rotor, if desired, to such extent as may be necessary or desirable for the above explained purposes.

In order to effect a better or more complete control of the separating functions, the process being a continuous one, it will sometimes be desirable to make provision for controlling the rate of inflow of the untreated material, under pressure, and/or for also controlling the rates of outflow of the separated components, in order to also control their several proportions. I have made provision for securing these results.

It is also noted that when operating at such very high rotative speeds as are herein contemplated, being of the order of thirty or forty thousand revolutions per minute for a rotor of four to six inches diameter, or higher speeds and/or diameters, very small amounts of dynamic unbalance are greatly emphasized, so that problems of design and bearing support are serious. Also, at such high rotative rates the problem of satisfactory delivery of the separated components from the rotor is important. It is a further feature and object of the present invention to provide a design and construction of separator, especially the rotor thereof, which can and will effectively and satisfactorily meet the onerous conditions just referred to, as well as others. In this connection, it is an object to provide a rotor which will be self-centering when rotating at and above the critical speeds, and at the same time to make provision for introduction of the untreated material to said rotor under continuous control, and to make provision for delivery of the several separated components from the rotor, also under continuous control.

It is a further object of the invention to provide a very rugged form of separator, one which may be readily built according to simple manufacturing operations; one which shall be susceptible of manufacture with great accuracy of the spirally extending passage, both as to radial dimensions of such passage and as to the thickness of the impervious sheet or partition; one of such construction that the spirally extending partition will provide a smooth and continuous surface against which the materials may travel and along and over which they may move with a continuity of separating action; and generally to provide a construction which is well adapted for accuracy and reliability of separating action. It is a further object to provide a construction which is susceptible of close balancing both statically and dynamically, so that it will run smoothly at very great speeds of rotation.

Other objects and uses of the invention will appear from a detailed description of the same, which consists in the features of construction and combinations of parts hereinafter described and claimed.

Figure 1:
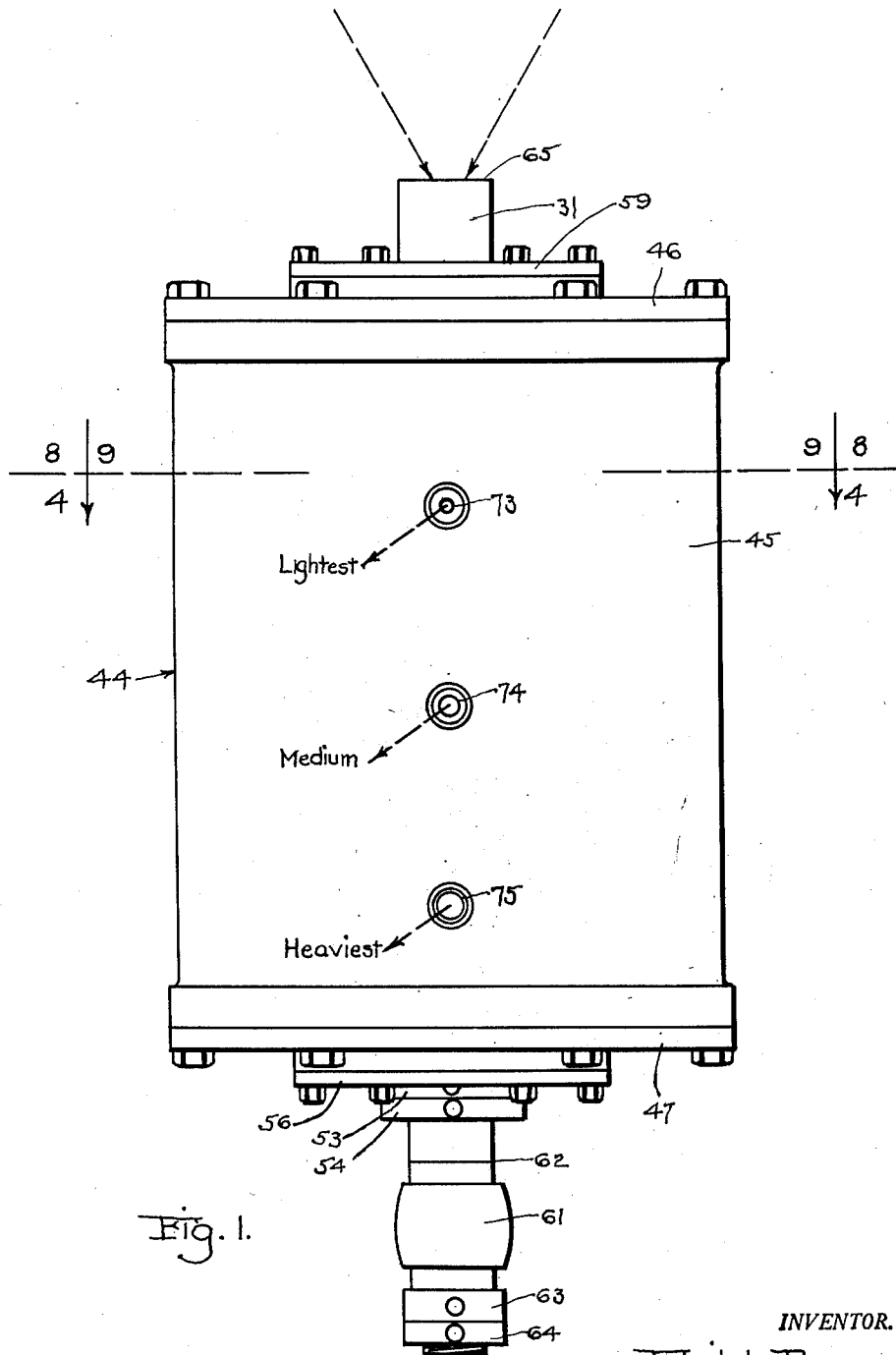
Figure 1 shows an elevation of a typical embodiment of my improved separator, showing a construction intended for effecting triple separation, if desired, that is, into three delivered components of three different specific gravities; and this figure shows such embodiment on what may be approximately full scale.
Figure 2:
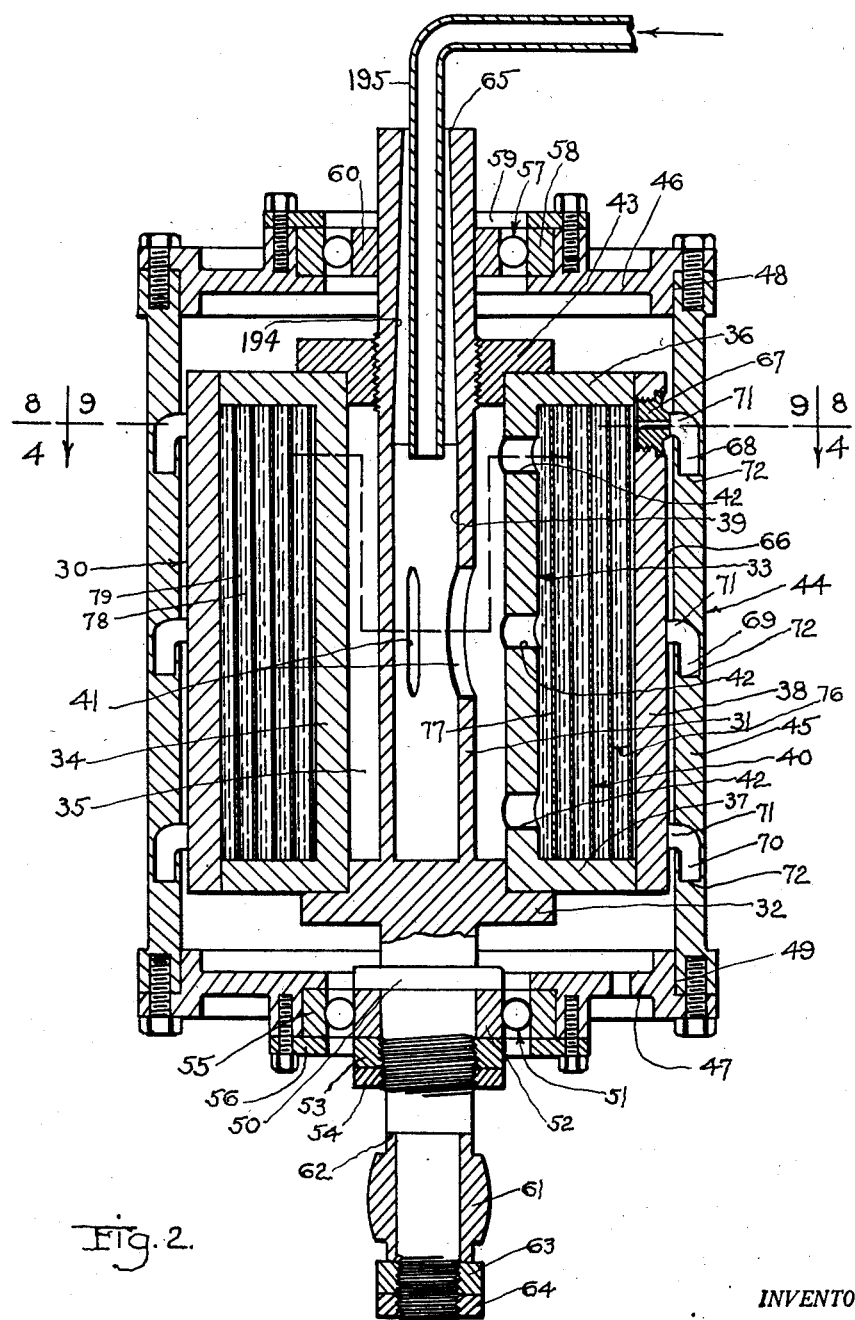
Figure 2 shows a vertical cross-section through the separator of Figure 1, being taken substantially on the lines 2—2 of Figures 2 and 4, looking in the directions of the arrows.
Figure 3:
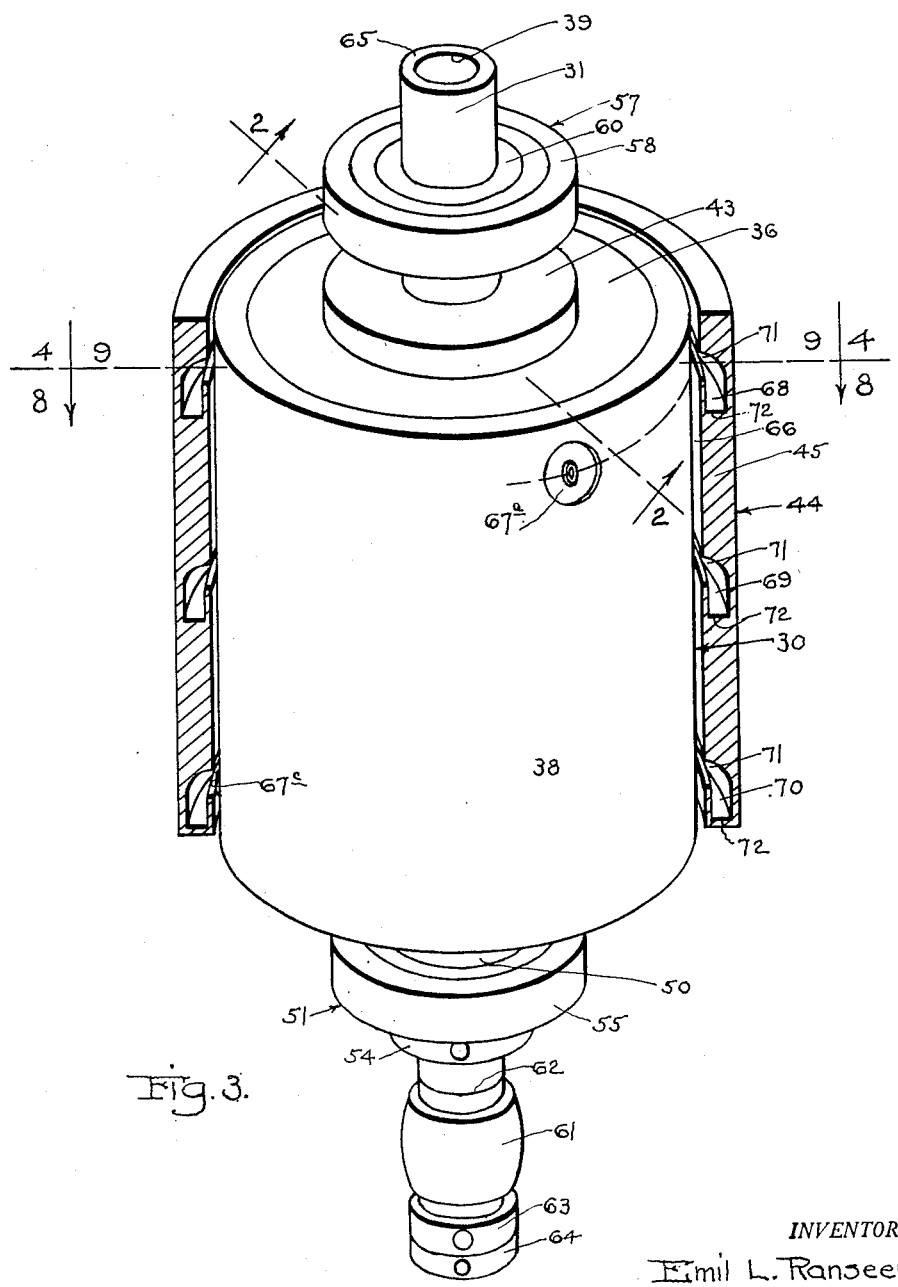
Figure 3 shows a perspective view of the rotor of the embodiment shown in Figures 1 and 2, together with the surrounding stator or housing in section, the upper and lower housing plates being not shown.
Figure 4:
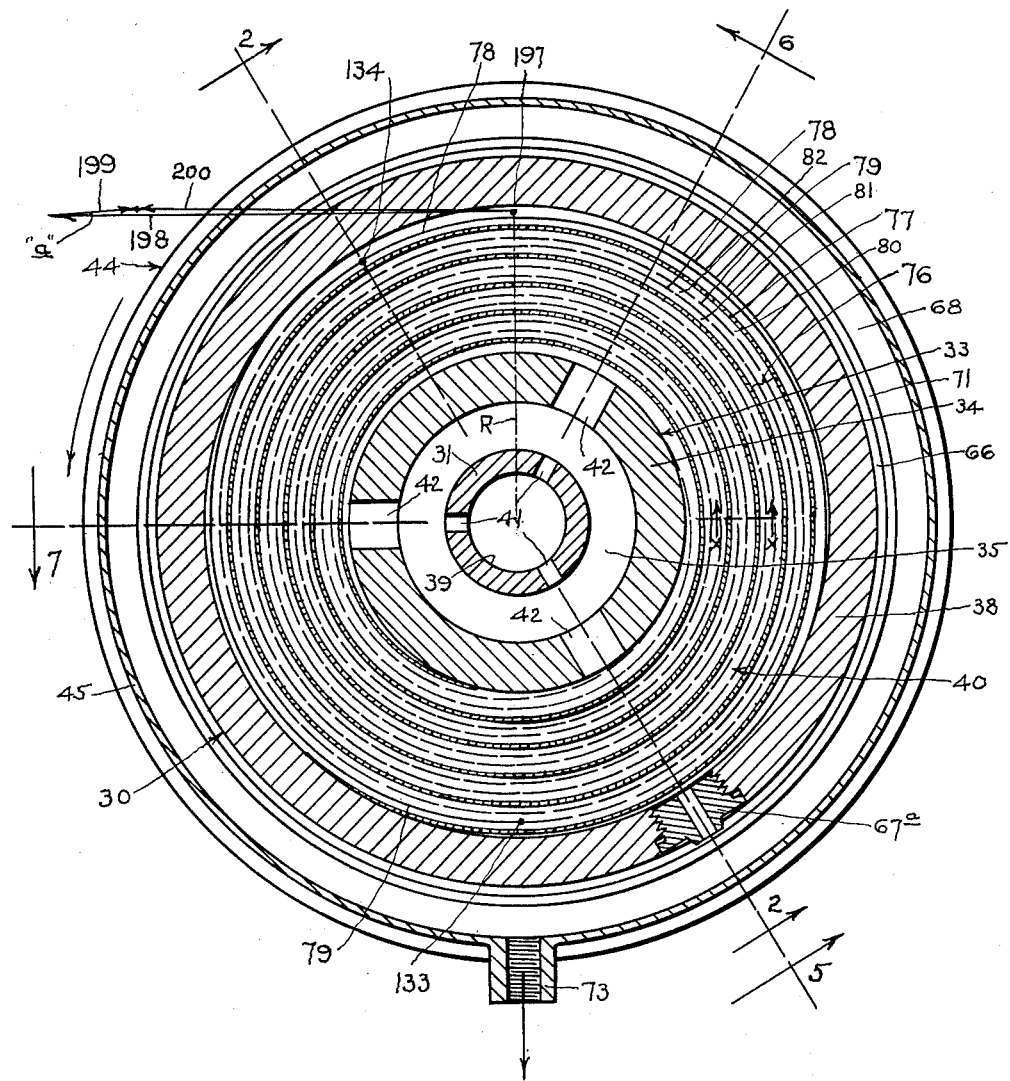
Figure 8:
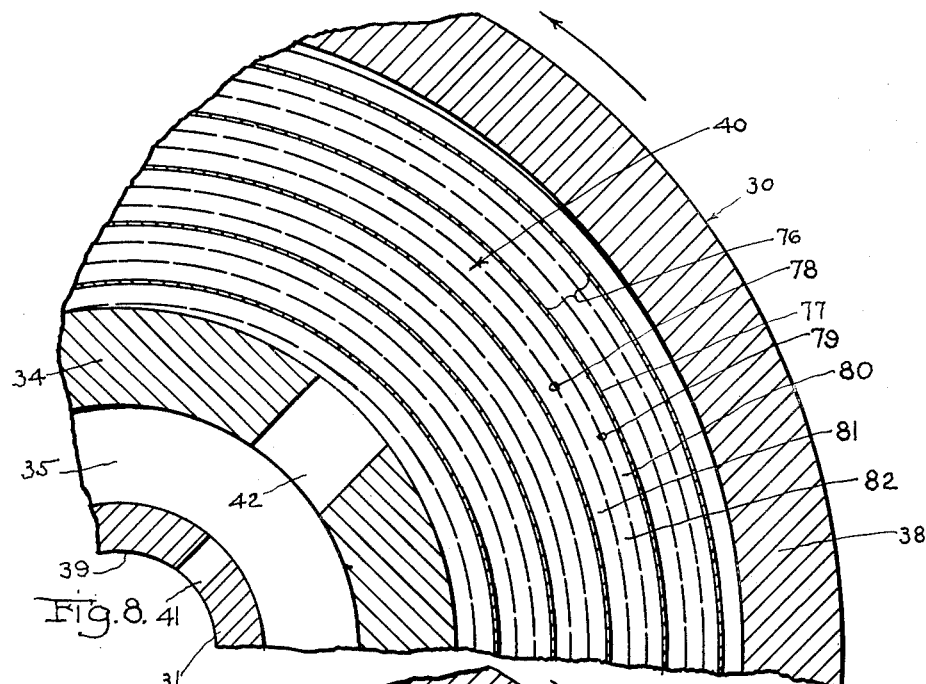
Figure 9:
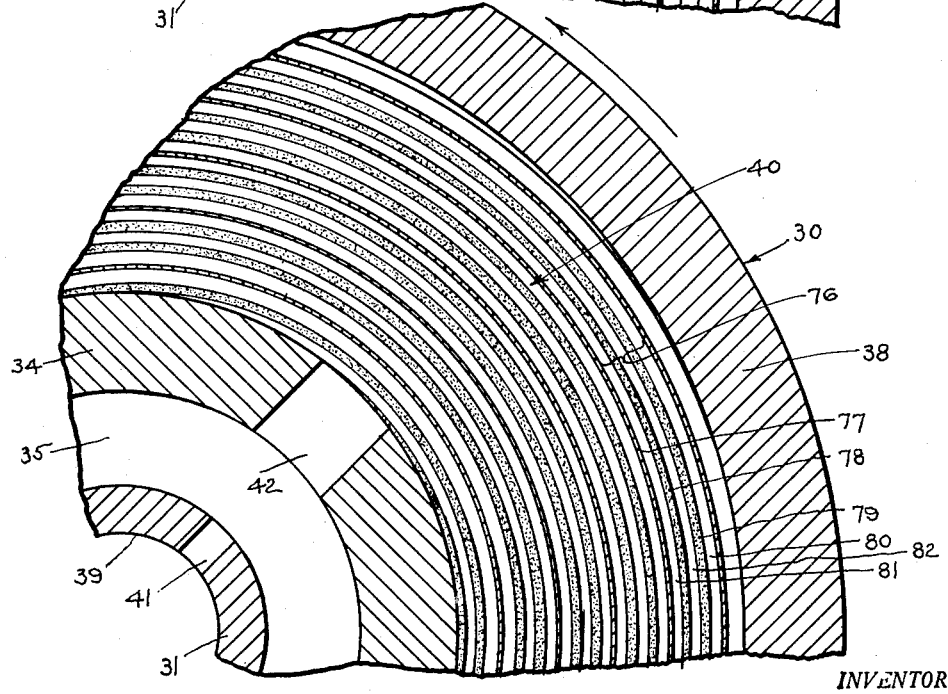
Figure 10:
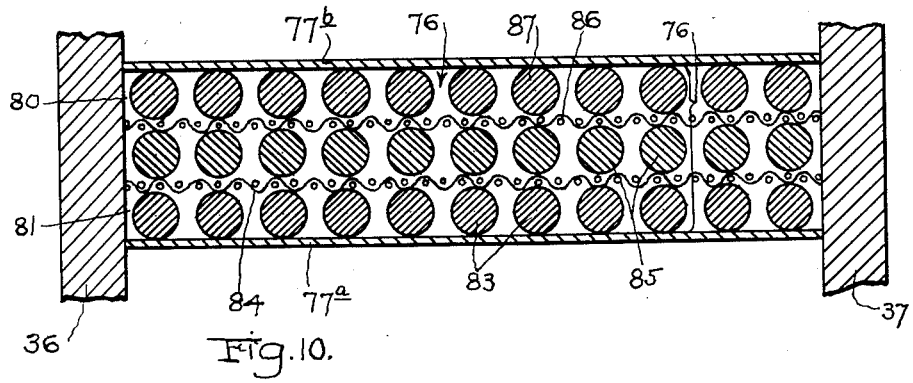
Figure 11:
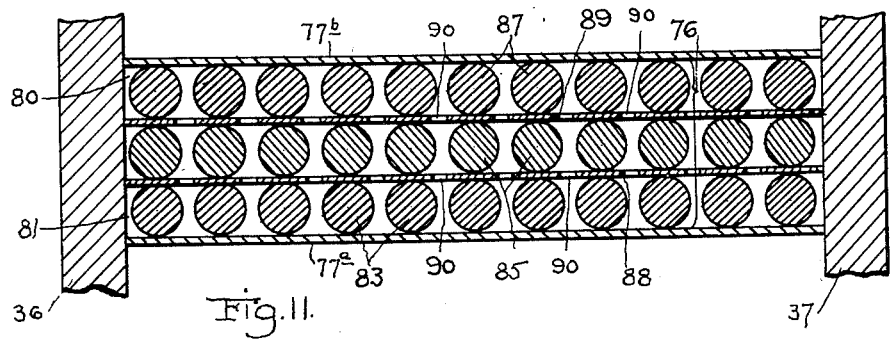
Figure 12:
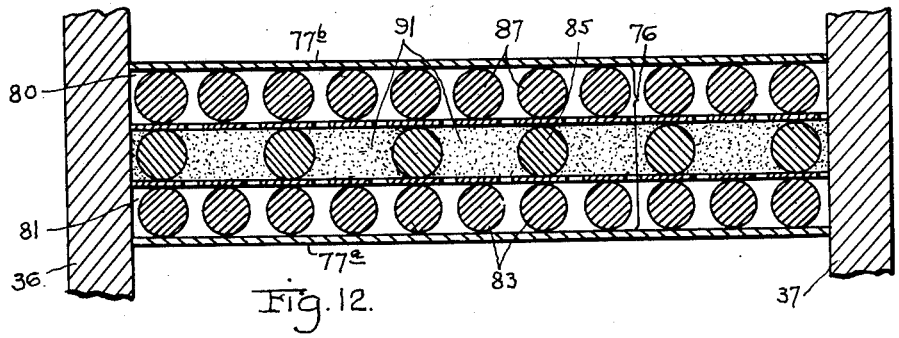
Figure 13:
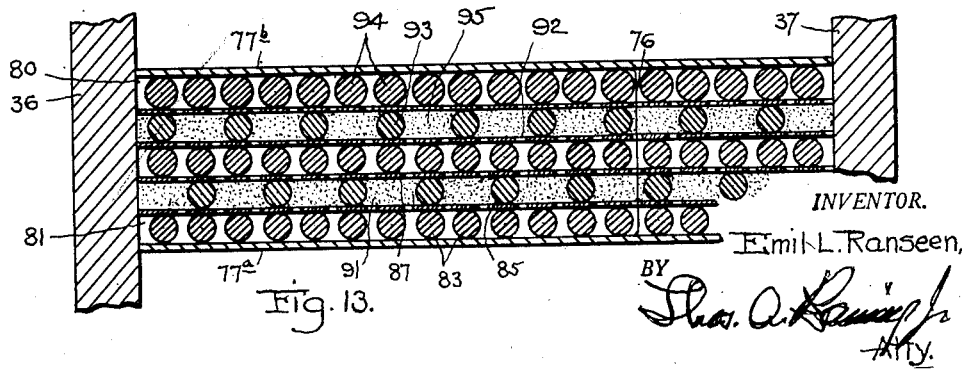
Figure 19:
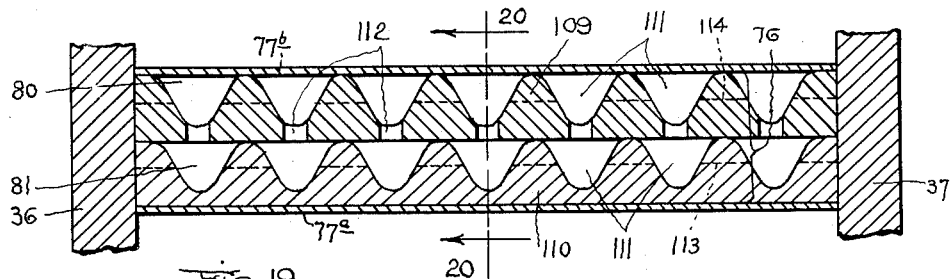
Figure 20:
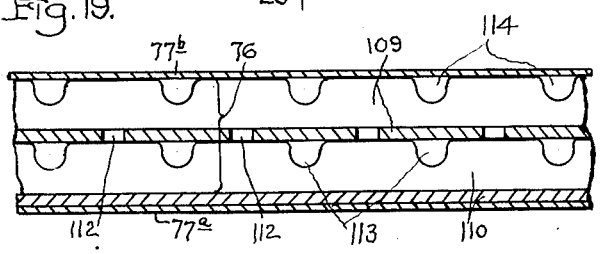
Figure 21:
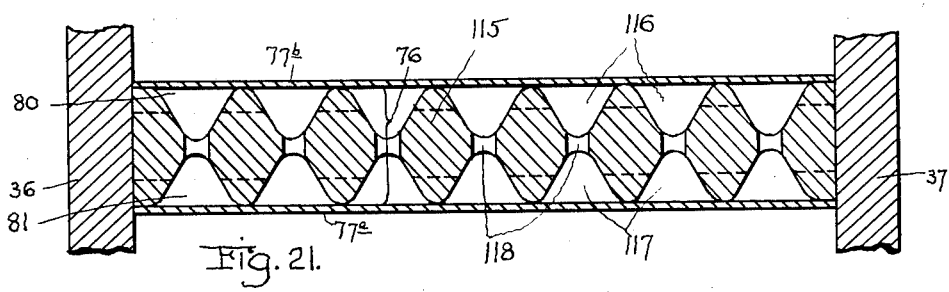
Figure 22:
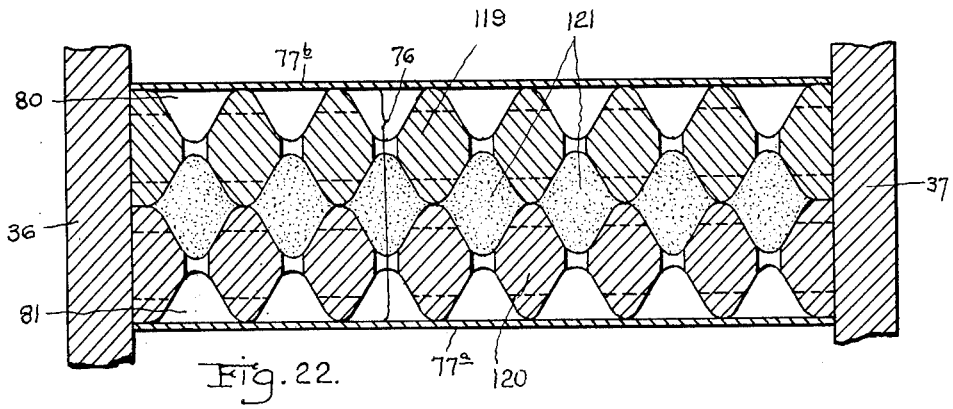
Figure 29:
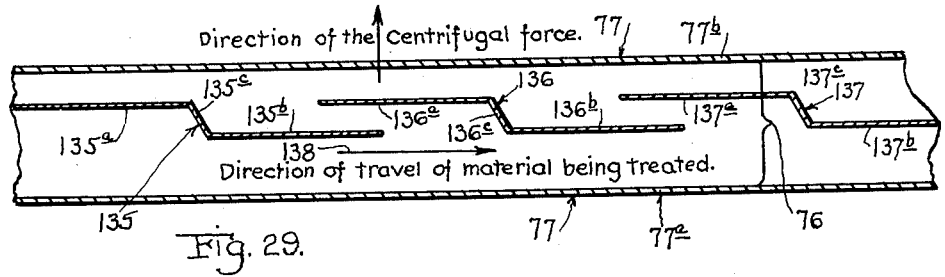
Figure 30:
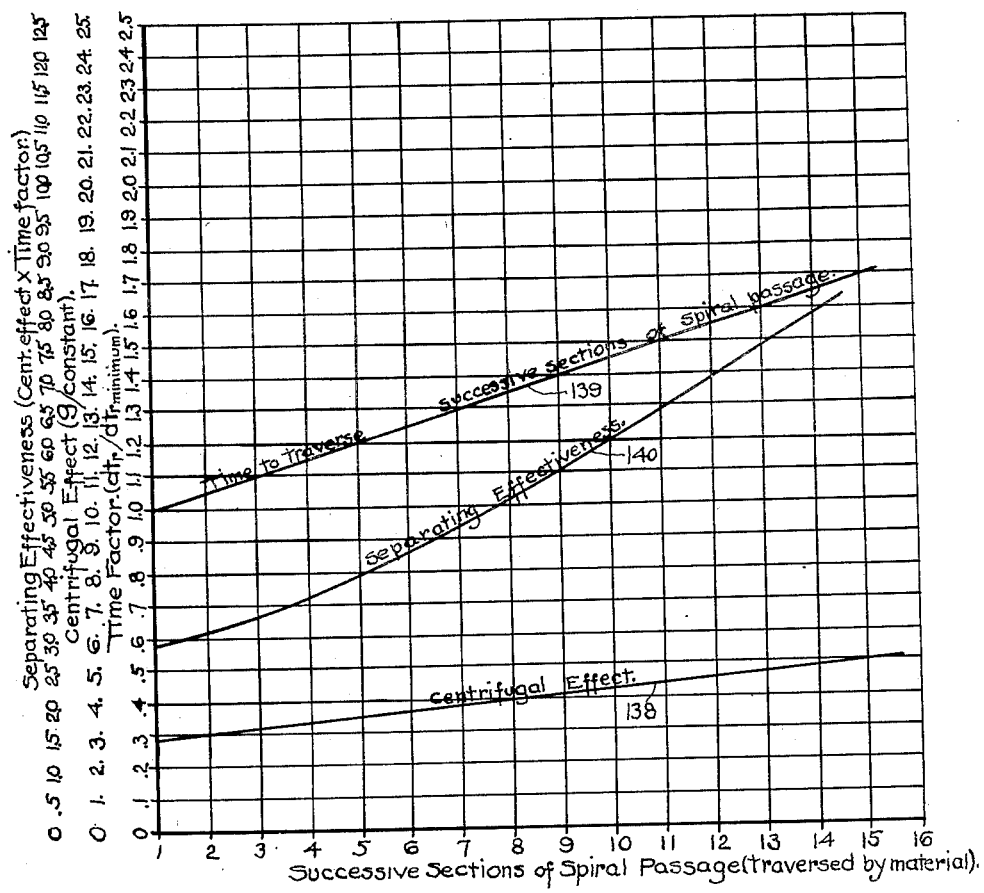

Figure 4 shows a horizontal section through the device of Figures 1, 2 and 3, but on enlarged scale, being a section taken on the lines 4—4 of Figures 1, 2, 3, 5, 6 and 7, looking in the directions of the arrows;

Figure 5 shows a fragmentary vertical section taken on the line 5—5 of Figure 4, looking in the direction of the arrows; and it shows the manner in which the uppermost discharge connection of the stator or housing serves to receive delivered component of the innermost layer of the spirally extending passage, and therefore component of the lowest specific gravity;

Figure 6 shows a view similar to that of Figure 5, but taken on the line 6—6 of Figure 4, looking in the direction of the arrows; and it shows the manner in which the intermediate discharge connection (if provided, or if non-plugged) of the stator or housing serves to receive delivered component of the intermediate portion of the spirally extending passage, and therefore component of intermediate specific gravity;

Figure 7 shows a view similar to those of Figures 5 and 6, but taken on the line 7—7 of Figure 4, looking in the direction of the arrows; and it shows the manner in which the lowermost discharge connection of the stator or housing serves to receive delivered component of the outermost layer of the spirally extending passage, and therefore component of the highest specific gravity;

Figure 8 shows a fragmentary horizontal section taken on the lines 8—8 of Figures 1, 2 and 4, looking in the directions of the arrows, but it is on greatly enlarged scale, and shows only approximately one quadrant of the entire plane; and it shows a passage arrangement in which said passage is subdivided by spirally extending spacers in the form of foraminated sheets;

Figure 9 shows a view similar to that of Figure 8, and taken on the lines 9—9 of Figures 1, 2 and 4, looking in the directions of the arrows, and on greatly enlarged scale, and showing only approximately one quadrant of the entire plane; and it shows another passage arrangement in which said passage is subdivided by longitudinally extending grooved sheets and with glass wool or the like located in some of the longitudinally extending grooves;

Figures 10, 11, 12, 13, 14, 15, 17, 18, 19, 21 and 22 are fragmentary sections taken substantially on the line x—x of Figure 4, looking in the direction of the arrows, but on greatly enlarged scale, and showing various forms of reinforcements in the spirally extending passage, and various forms of sub-divisions of said passage into interconnecting zones wherein the separated components will tend to collect; said various embodiments being as follows;

Figure 10 shows an arrangement including two longitudinally extending foraminated sheets, such as sheets of fine screening, together with three sets of longitudinally extending spacer wires, the entire ensemble providing a three zone or component arrangement;

Figure 11 shows an arrangement similar to that of Figure 10, but showing two sheets of foraminated material in place of the sheets of screening as shown in Figure 10;

Figure 12 shows an arrangement similar to that of Figure 11, but with intermediate or alternate wires left out of the middle zone, and filler material of such permeable material as glass wool located in the spaces thus provided; it being noted that Figure 11 shows a three zone arrangement, whereas Figure 12 shows a two zone arrangement;

Figure 13 shows an arrangement similar to that of Figure 12, but it shows additionally two additional foraminated sheets, and additional longitudinally extending wires and fillers to provide a third zone of separation;

Figure 14 shows another arrangement in which the entire radial dimension between the successive convolutions of the impervious sheet is occupied with spirally wound wires of such radial dimension, such wires being slightly separated, thus providing a simple arrangement providing two separating zones; and it is to be noted that even with the wires supposedly occupying the full radial dimension between the successive convolutions, there will be slight inequalities in both the wires and the impervious sheet so that movement of the liquid laterally past the wires, and within the passage, may occur, thus allowing sufficient lateral distribution to occur between the longitudinally extending spaces between the wires;

Figure 15 shows another arrangement in which the wires are set closer together than with the arrangement of Figure 14; it being noted that the arrangements of Figures 14 and 15 are two zone or two component arrangements;

Figure 16 shows a fragmentary section taken on the line 16—16 of Figure 15, looking in the direction of the arrows; and it shows encircling grooves on the wires to further provide for lateral transfer or movement of the material past the wires while remaining within the spiral passage;

Figure 17 shows another arrangement in which the separators take the form of corrugated sheets placed between the convolutions of the impervious sheet; said corrugated sheets also being perforated to allow for movement of the material through such perforations; the arrangement of Figure 17 being a two zone arrangement;

Figure 18 shows an arrangement similar to that of Figure 17, but it shows a third corrugated sheet of perforated form, in place, to provide a third zone of separation;

Figure 19 shows another arrangement in which the separators take the form of sheets of greater thickness than the foraminated corrugated sheets of Figures 17 and 18, said sheets of Figure 19 being longitudinally grooved to provide longitudinal grooves which provide the desired subpassages of the spirally extending passage; and these sheets are also perforated to allow for the necessary movement of material through them; the arrangement of Figure 19 being a two zone arrangement;

Figure 20 shows how the tips of the peaks of the plates shown in Figure 19 may be periodically notched to provide for lateral movement of the separating material past such peaks;

Figure 21 shows another arrangement similar to that of Figures 19 and 20, but making use of a thicker interplate, grooved on both faces to provide the necessary longitudinally extending sub-passages, and perforated periodically to provide for movement of the material through such plate; the arrangement of this figure being a two zone arrangement;

Figure 22 shows another arrangement in which there are provided two separators of the general form shown in Figure 21, to provide intermediate longitudinally extending sub-passages, previous material such as glass wool being placed in these intermediate sub-passages; the arrangement of Figure 22 being in effect a two zone arrangement;

Figure 23 shows a vertical section through a modified form of rotor embodying the features of the present invention, the figure being partially broken away; and it shows the provision for introducing several consistuents of a chemical reaction separately into the upper end portion of the rotor, with separate passages for delivering these constituents separately to points close to or in direct communication with the inner end portions of the spirally extending passage where said constituents may intermingle to react together for the desired chemical reaction;

Figures 24, 25, 26 and 27 are fragmentary horizontal sections taken on the lines 24—24, 25—25, 26—26, and 27—27, respectively, of Figure 23;

Figure 28 is a section similar to that of Figure 11, but showing how, if desired, some or all of the wires may be formed of catalytic material, such as platinum for promoting and invigorating the chemical reaction;

Figure 29 is a fragmentary section, more or less schematical, and on greatly enlarged scale, of a portion of the length of the spiral passage, but developed into a straight section, and it shows an arrangement of sub-partitions of impervious material arranged for producing a "stage" effect in the separating process, the separated lighter component being periodically isolated from the heavier material, and such heavier material being then subjected to a further centrifugal action to remove a further portion of any lighter material contained therein;

Figure 30 shows characteristic curves of typical performance of a separator embodying features of my present invention, and one of these curves shows how the time intervals required for material to traverse successive angular sections of the spiral passage increase as the material moves at uniform linear velocity along such spiral passage, so that the rate at which said material moves to successively greater radii falls continuously during flow of the material through the passage; or said curve may be considered to show how the time interval during which the material remains subject to the centrifugal action during increasing intervals of time as successive sections of the passage are traversed; another of these curves shows how the centrifugal effect increases as successive sections of the spiral passage are traversed, due to the increasing radius of said passage, measured from the axis of rotor rotation; and the third of these curves shows how the separating effectiveness increases rapidly as successive sections of the spiral passage are traversed, due to the combined effects of increasing centrifugal action (due to increasing radius of the spiral passage from the axis of rotation), and slowing down of angular movement of the material, measured about the axis of rotation, due, also, to the increase of radius of the spiral passage measured from the axis of rotation;

Figure 31 shows a modified embodiment of features of my present invention, in which the shaft is provided with supply and delivery passages through which the untreated material is supplied to the spiral passage, and through which the separated components are delivered separately from the outer delivery end of such spiral passage; and this figure also shows an arrangement embodying a flexible shaft and suitable bearings therefor, so that any slight dynamic unbalance of the rotor may be properly taken care of at high speeds of rotation; and this figure also shows means for supplying the untreated material under pressure, and for controlling the rates of delivery of the separated components so that the operations may be controlled during continuation of the separating action; and this figure also shows means to heat the rotor during the operation thereof for controlling the viscosity of the material undergoing treatment; and Figure 32 shows a cross-section taken on the line 32—32 of Figure 31, looking in the direction of the arrows.

Referring to Figures 1 to 9, inclusive, the separator illustrated includes a cylindrical rotor element, 30 which includes the spiral passage within which the separating action takes place. This rotor includes the shaft 31 having the flange 32 at its lower end portion. The body of this rotor is of generally U-shaped cross-section, 33, and includes the central tubular portion 34 which surrounds, but is separated from the shaft 31 so as to provide the annular vertical passage 35 or distributing space. Said section 33 also includes the upper and lower radially extending flanges 36 and 37, respectively. An outer cylindrical or tubular closure 38 fits closely over these end flanges 36 and 37 so as to enclose the space within the U-shaped element. This closure 38 may be made of a tight fit onto the flanges so as to retain it securely in place, and to prevent unnecessary leakage between said closure and the flanges themselves. The shaft 31 is provided with an axial passage 39 extending down through the shaft far enough to provide communication with the interior 40 of the U-shaped element. Such communication is effected by the lateral openings 41 in the shaft and through which incoming mixture flows from the passage 39 to the space 35; and the tubular portion 34 of the U-shaped element 33 is provided with the openings 42 which establish communication between the distributing space 35 and the space 40 within the element 33. Such communication is effected at the inner or small radius portion of such space 40; and preferably these openings 42 are regularly spaced along the vertical dimension of the space 40 for reasons which will presently appear.

The U-shaped element 33 is clamped against the flange 32 by means of an upper flanged nut 43 which is threaded onto the shaft, and if necessary suitable locking means may be provided for locking the U-shaped element to the shaft so as to ensure rotative drive of the U-shaped element by drive of the shaft. Generally, however the clamping produced by the nut 43 will be sufficient to ensure proper drive of the U-shaped element, since only a small amount of power is needed to maintain the rotor speed, once that rotor has been brought up to speed.

Surrounding the rotor is the housing, 44. This housing includes the cylindrical or barrel shaped section 45, and the upper and lower end plates 46 and 47, respectively. These end plates are conveniently shouldered around their outside edges as shown at 48 and 49 to receive the end portions of the barrel portion 45, thus holding said barrel portion in exact axial alignment with the rotor and also providing a good design mechanically. The shaft carries the flange 50. The lower end plate 47 carries the anti-friction bearing 51, and the inner race-way 52 of this bearing is clamped against the flange 50 by the nut 53 threaded onto the shaft. A lock nut 54 is provided for said nut 53. The outer race-way 55 of this bearing 51 is held to the end plate 47 by the bearing retainer 56. Thus the bearing 51 constitutes a thrust bearing for retaining the shaft and rotor in correct position with respect to the housing. The upper end plate 46 carries the anti-friction bearing 57, and the outer race-way 58 of this bearing is held to the end plate 46 by the bearing retainer 59. The inner race-way 60 of this bearing receives the shaft, but without end restriction, so that said bearing 57 comprises a floating bearing in the well understood term.

The lower portion of the shaft carries a small pulley 61 which is clamped against the shoulder 62 of the shaft by means of the clamping nut 63, and a lock nut 64 acts against said clamping nut 63. Suitable means is provided for driving the pulley at high speed, and speeds of many thousand revolutions per minute are contemplated.

The materials to be treated are supplied into the upper end 65 of the passage 39 at such rate as may be needed and depending on the rate at which the materials are flowing through the rotor, and to maintain the rotor properly filled with material at all times during the separating operations. Means are provided for regulating or pre-adjusting the rate at which material may be discharged from the rotor, as will be explained hereinafter.

The cylindrical housing member 45 is of such diameter as to provide only a small clearance, 66 between the outer face of the rotor and the inner face of such member 45. The rotor element 38 is provided with two or more nipples or nozzles, such as 67 through which the separated materials are discharged from the rotor; and the cylindrical element 45 is provided with the annular inwardly facing material receiving channels or grooves 68, 69 and 70 corresponding to such nozzles, and in position to receive material as continuously discharged from said nozzles, as will presently appear more in detail. Each of these channels includes the encircling inwardly facing opening 71 through which the material is thrown as delivered by the corresponding rotor nozzle. Each such opening 71 also communicates with an enlarged annular passage section 72 wherein the material continuously collects; and each of these sections 72 communicates with a corresponding delivery connection provided in the exterior of the housing, these being the connections 73, 74 and 75, as shown in Figures 1 and 4.

The interior 40 of the rotor is provided with the spirally extending passage hereinbefore referred to. This is the passage 76 shown in various figures. This passage is formed by the thin impervious sheet 77 preferably of tough or strong metal which will not be affected by the materials to be treated, this sheet being of the full vertical dimension of the rotor between the flanges 36 and 37, such dimension being the width of the passage. In Figures 2, and 4 to 9 inclusive, there are shown approximately five convolutions of this sheet, so that the passage 76 makes approximately five complete turns within the body of the rotor between the inner or inlet end of such passage and its outer or discharge end. Also, the thickness or radial dimension of this passage is measured by the distance between successive convolutions of the sheet. In Figures 4 to 9 inclusive this thickness or radial dimension is shown by the bracket, although the passage itself it also shown as being sub-divided into a number of sub-sections, which will be presently described more in detail.

At this point I will state that the openings 42 in the inner cylindrical portion 34 communicate with the inner end of the spiral passage 76 for supply of material to such inner end. It is also noted that sets of these openings 42 are provided at three positions angularly around the cylindrical portion 34, so that such material is supplied to the spiral passage at positions close to the inwardly facing surface of the sheet 77 (being close to the largest radius portion of the passage 76), also close to the outwardly facing surface of the sheet 77 (being close to the smallest radius portion of the passage 76), and also at a position substantially midway of the thickness of such passage 76. Thus there is good supply of the material to all portions of the inner or small radius end of such passage. It is also noted that these openings 42 are located at various elevations of the rotor, being at various positions along the width of the passage, so that good distribution of the incoming material is effected not only at various positions in the thickness of such passage, but also at various positions in the width of the passage.

Comparison of Figures 2, 4, 5, 6 and 7 shows that there are three of the discharge nipples or nozzles 67 set through the closure 38 at three positions around the periphery of the rotor, that is, at positions 120 degrees apart. Also, that these three nipples or nozzles are located at three positions along the axial length of the rotor, and in planar alignment with the three channels 68, 69 and 70. These three nipples or nozzles are designated 67$^a$, 67$^b$ and 67$^c$, respectively for convenience of identification. These three are therefore located 120 degrees apart around the axis of the rotor, the three sections 5, 6 and 7 being taken at positions 120 degrees apart as well shown in Figure 4. Accordingly these three nipples or nozzles, although all communicating with the outer or large radius terminal end of the passage, nevertheless communicate with portions of such passage which are at the inner or small radius portion of the delivery end of the passage (being the nozzle 67$^a$), at the central portion of the thickness of such passage (being the nozzle 67$^b$), and at the outer or large radius portion of the delivery end of the passage (being the nozzle 67$^c$). Therefore each of said nozzles will deliver separated material or component from that portion of the delivery end of the passage which directly communicates with such nozzle. Since the heaviest or greatest specific gravity material has collected against the inwardly facing surface of the passage (being the largest radius portion of the delivery end of such passage), the nozzle 67$^c$ will receive such highest specific gravity material or component; and analysis will also show that the nozzle 67$^a$ will receive the lowest specific gravity material or component, and the nozzle 67$^b$ (when provided) will receive material of intermediate specific gravity. Thus the several separated components will be individually delivered through appropriate nozzles from which said components may be received individually.

It is seen from the foregoing that each of the delivery nozzles communicates with a portion of the spirally extending passage at a different zone of such passage at the delivery end of the passage. This is true notwithstanding that all of these nozzles are actually located at the same radius of the rotor, namely, the outer face of such rotor. This is also true due to the fact that successive zones of the passage reach the outer cylindrical surface of the space within which the sheet 77 is wound, at successive positions around the circumference of the rotor. The outer or high specific gravity zone reaches said cylindrical surface at the position of the plane 7 of Figure 4, the inner or low specific gravity zone reaches said surface at the position of the plane 5 of Figure 4, and the intermediate specific gravity zone reaches said surface at the position of the plane 6 of Figure 4.

Reference to Figures 2, 4, 5, 6, 7, 8 and 9 shows that the spiral passage 76 is shown as being subdivided by the intermediate spirally extending dashed lines 78 and 79 thereby providing the three zones 80, 81 and 82 for high, low, and intermediate specific gravities, respectively. These dashed lines indicate suitable permeable partitions or elements located within the passage 76 and, while serving to assist in retaining distinct grades of material or components in separated condition, still do not materially interfere with free movement of the material within the dimensions of the passage 76 at any given position throughout the length of that passage where separation is to proceed. Various forms of these dashed line partitions of permeable nature will be described hereinafter, and are shown in Figures 10 to 23, inclusive by way of illustration. At this point, however, it is shown that at any given location along the spiral length of the passage 76 said passage had a radial dimension equal to the radial distance between two consecutive convolutions of the sheet 77. This sheet is impermeable, and reaches substantially the full distance from the inner or axial portion 34 of the U-shaped element 33 to the inner surface of the outer cylindrical element 38 which closes said U-shaped element. Said sheet is preferably of nice fit between the upper and lower flanges 36 and 37 of the rotor, and may be welded, or brazed or soldered to said flanges in order to give good support to the upper and lower edges of the sheet, and to retain the convolutions in permanent spacing and equality of radial dimension. Also, to prevent leakage of material directly from one convolution to the convolution of next greater diameter or radius. Such leakage would impair but not destroy the separating process, as it would in effect short-circuit a portion of the passage length through which the material should travel. Such leakage, however, would not permit the material to find its way out of the body of the rotor, since the only points of exit of material from the rotor consist of the nozzles or nipples, 67ª, 67ᵇ, and 67ᶜ, already referred to.

Assuming that the untreated material is supplied to the axial passage 65 at rate sufficient to ensure a continuously filled rotor, it is evident that such rate must be sufficient to correspond to the rate at which material will be delivered out through the nipples or nozzles 67ª, 67ᵇ, and 67ᶜ. That rate will depend on the sizes of the orifices of these nozzles, and on the centrifugal pressures developed against the inner face of the cylindrical closure 38, as well as the resistances or impedances to flow along the spiral passage created by the sub-partitions, 78 and 79, and any other resistance factors existing within the body of the rotor, including viscosity, etc. On the assumption that such rate of supply through the passage 65 is sufficient to meet such demand, it is evident that a continuous flow of material along the spiral passage will continue and that the separating action will be going on through a large portion or all of such length. Now the rate at which separated material will be delivered through each of the nipples or nozzles will depend, among other things, on the diameter of the orifice of such nozzle, and according to well understood principles of hydraulics. In any case it may be assumed that these orifices are of very small size in comparison to the cross-sectional area of the spiral passage itself, so that the rate of flow of material along the length of the passage is very small in comparison to the rate of flow through each of the orifices. Such being the case it may also be assumed that substantially the full centrifugal force developed in the body of liquid material within the rotor will appear as pressure against the nozzles or nipples, in pressure per unit area, and that only a very small portion of the centrifugally developed pressure will be required to effect movement along the length of the spiral passage itself. It is therefore fair to assume that the delivery of liquid through each orifice will be proportionate to the size of that orifice, taking into account the usual laws of flow of liquids through orifices as related to diameters and lengths thereof. Accordingly it is possible to so design each and all of the several orifices, whether two, three, or more of them, that the full required outflow rate will be produced for a given speed of rotation of the rotor, and for specified materials being treated; and also it is possible to provide these several nozzles or nipples with orifices of different sizes so that the rates of delivery through them will be related to each other according to the several proportions of the separated components as produced by the separating action. In other words, the group of orifices considered as a group will take care of delivery of the full liquid capacity of the separator, and at the same time the several orifices will deliver proportions of material corresponding to the proportions which the several components thus separated bear to each other.

In connection with the foregoing features reference to Figures 5, 6 and 7 will show that the orifice of the nozzle 67ª is smaller than that of the nozzle 67ᶜ, and that the orifice of the nozzle 67ᵇ is of intermediate size. As thus proportioned the separator would be intended for use with a material originally containing a maximum proportion of the heavy material, a lesser proportion of the light material, and an intermediate proportion of material of intermediate specific gravity. Such an arrangement would be capable of separating the introduced material into three components, assuming that there were three components to be separated. In case there were only two components in the introduced or raw material, the nozzle or nipple 67ᵇ might be removed, and the opening in the cylindrical element 38 plugged, leaving only the two nozzles 67ª and 67ᶜ in operation for delivery of two separated components. Thus a three component separator may be used for either two or three component operation. A separator provided with channels and rotor construction intended for delivery of more than three components might likewise be modified for use with a less number of components than its intended design.

In Figures 10 to 22, inclusive I have shown fragmentary sections through various arrangements for reinforcing and subdividing the passage 76 without materially interfering with the necessary movements of liquid within said passage in order to permit separating action to occur.

In Figure 10 two adjacent convolutions of the sheet 77 are shown at 77ª and 77ᵇ, the passage being shown by the bracket 76. The thickness of said passage (76) is shown greatly exaggerated as compared to the distance between the two end plates 36 and 37. In the form shown in Figure 10 I wind a strong wire 83 on the convolution 77ª, the convolutions of this wire being slightly spaced from each other or "laid" as shown in said figure to facilitate the radial movement of the material being treated and during the separation process. On the convolutions of this wire 83 I wrap a fine wire screen 84 of which the foraminations are such as to also allow a free radial movement of the material being treated. Then I wind another wire 85 on this wrap of screening, leaving slight separations between the convolutions of this wire 85; then another fine screen 86 is wrapped onto the wire 85, and finally another wire 87 is wound onto the screening 86, with its convolutions slightly separated as shown in Figure 10. The next convolution 77ᵇ of the impervious sheet is laid onto this wire 87.

With this arrangement it is evident that the material may freely move radially between the sheet convolutions 77ª and 77ᵇ, moving through the screenings and between the turns of the wires, so that the heavier material may collect against the face of the sheet convolution 77ᵇ, crowding the lighter material back or inwardly towards the sheet convolution 77ª, the material moving through the screening and between the wire convolutions during this process. It is also evident that movements of material between the plates 36 and 37 may occur, that is, away from one of said plates and towards the other, since there is a certain freedom of movement through the bodies of the screenings and between the wires in contact with such screenings. Furthermore, it is noted that Figure 10 is shown on a greatly enlarged scale as regards the distance between the convolutions 77ª and 77ᵇ, and that said wires are also shown in greatly exaggerated diameters, and that in reality said wires will not lie at all points in close contact with the sheet convolutions, but there will be slight irregularities in the wires and in the sheet convolutions, so that slight interstices will exist through which material may also move towards and from the respective end plates 36 and 37. Thus the necessary movements laterally and radially within the passage, as well as along its spiral length are provided for.

The several constituents in the form of the wires 83, 85 and 87, and the screenings 84 and 86 are wrapped in proper order during the process of also spirally wrapping the impervious sheet 77, so that as each convolution of said sheet is completed said wires and screenings will also be in place and then the next convolution of the sheet 77 will wrap onto the turns of the wire 87. The edges of said sheet 77 should also be soldered or tacked or welded or brazed to the end plates 36 and 37 as the building up process proceeds, so that as each convolution of the sheet is completed said sheet is properly attached to the end plates 36 and 37, and also the wires and the screenings will be in place.

With such a construction it will be seen that I have produced a rotor which is cylindrical in form, and its interior or body is packed with the impervious partition sheet 77, and the interlayers of wires and screenings. This body is of course also provided with the spirally extending passage 76. The interlayers of wires and screenings serve not only to assist control of the movements of material while undergoing separating process, but also help to retain the convolutions of the sheet 77 at exact spacing, and with said convolutions of a substantially exact spiral form, and without any retrogressions in radius as movement progresses towards the outer periphery of the rotor. Thereby there is assurance that smooth and continuous separating action will proceed under centrifugal action.

The arrangement shown in Figure 11 is similar to that of Figure 10; but in the case of Figure 11 I have replaced the layers of screenings 84 and 86 with layers or convolutions of a pervious or foraminated sheet 88 between the wires 83 and 85, and another pervious or foraminated sheet 89 between the wires 85 and 87. These sheets 88 and 89 are provided with numerous small holes 90 through which the material being treated may move.

The arrangement shown in Figure 12 is similar to that of Figure 11, but in the case of Figure 12 the intermediate wire 85 is wrapped with a larger "lay" between its convolutions, so that spaces 91 of exaggerated width are provided. These may either be left completely open, or they may be partially or wholly filled with material such as glass wool, or other "fibrous" matter which will not be affected chemically by the materials being treated; or other wires of smaller size may be wrapped into such interspaces 91. It is here noted that the scheme shown in Figure 12 is really a two zone arrangement for producing a rotor to effect separation into two components of material; while the arrangements shown in Figures 10 and 11 are three zone arrangements.

In Figure 13 I have shown another arrangement similar to that of Figure 12, but in the case of Figure 13 I have provided an additional foraminated sheet 92, and the additional wires 93 and 94, the convolutions of the wire 93 being spaced apart to accommodate the fillings of material 95 similar to the material 91 shown in Figure 12. This arrangement of Figure 13 produces a three zone arrangement; and preferably the wires should be of smaller diameter than the wires of the arrangements of Figures 10, 11 and 12, in order that the radial distance between consecutive convolutions of the impervious sheet 77 may be the same as in said earlier forms of Figures 10, 11 and 12.

In the arrangement shown in Figure 14 the successive convolutions 77ª and 77ᵇ of the impervious sheet are separated by a single wire 96 whose convolutions are slightly separated from each other. This wire is of larger size than the wires of the previously described arrangements, and it occupies substantially the full radial distance between the consecutive convolutions 77ª and 77ᵇ. The turns of this wire are slightly separated from each other to facilitate radial movement of material between said turns; and lateral movements of material within the passage may occur due to slight inequalities of the wire itself as already explained, The arrangement shown in Figure 15 is similar to that of Figure 14, but in the case of Figure 15 the convolutions of the wire are laid close together. Also, as shown in the section of Figure 16 this wire, being of larger size than the wires of the arrangements shown in Figures 10, 11, 12 and 13, may be provided with regularly spaced encircling grooves or indentations 97 so that definite provision has been made for movement of material both radially and laterally within the confines of the spirally extending passage.

In the arrangement shown in Figure 17 I have provided a pair of foraminated sheets 98 and 99 between the convolutions of the impervious sheet, 77ª and 77ᵇ, these sheets 98 and 99 being corrugated lengthwise, that is, in the direction of the length of the spiral passage. The corrugations of these two sheets are set together as shown in Figure 17 so that there are provided longitudinally extending sub-passages 100, 101 and 102 between the convolutions 77ª and 77ᵇ; and these sub-passages are connected by the openings 103 of the sheets 98 and 99 to provide for movements of the material according to the principles already explained. These foraminated sheets 98 and 99 also serve to brace the convolutions 77ª and 77ᵇ with respect to each other and to retain said convolutions at proper spacing.

The arrangement shown in Figure 18 is similar to that shown in Figure 17, but in the case of Figure 18 there are provided three corrugated sheets 104, 105 and 106, each of which is foraminated; and between these corrugated sheets there are provided the additional foraminated sheets 107 and 108. These are foraminated to allow for free movement of material through them. The arrangement of Figure 17 is a two zone arrangement and that of Figure 18 is a three zone arrangement.

In the arrangement shown in Figures 19 and 20 I have provided sheets 109 and 110 in place of the sheets 98 and 99 of the arrangement of Figure 17, or the sheets 104, 105 and 106 of the arrangement of Figure 18. These sheets 109 and 110 are of such thickness that they can fully occupy the radial space between the convolutions 77ª and 77ᵇ; but these sheets 109 and 110 are longitudinally corrugated to provide the grooves 111. These sheets 109 and 110 are also provided with numerous holes 112, to provide for radial movement of material between the grooves of the two sheets. Slight inequalities in the sheets 109 and 110 will allow such lateral movements of material as may be necessary, according to the principles heretofore stated. However, if needed, the sheet 110 may also be provided with the notches 113, and the sheet 109 may also be provided with the notches 114 to facilitate such lateral movements of material.

In the arrangement of Figure 21 I have provided a single sheet 115 between the convolutions 77ª and 77ᵇ. This sheet 115 is of thickness substantially the same as the radial dimension of the spiral passage. This sheet 115 is provided with longitudinally extending grooves 116 on one face, and 117 on the other face, providing the longitudinally extending passages for movement of material along the length of the spiral passage. There are also provided through holes 118 in this sheet, said holes preferably being formed at the valleys of the grooves as shown, to provide for radial movements of material. This is a two zone arrangement.

The arrangement of Figure 22 is similar to that of Figure 21, but in the present case there are provided two of these doubly grooved sheets, namely, 119 and 120, placed in the spiral passage with their peaks in alignment so that proper reinforcement between the convolutions 77ª and 77ᵇ is provided. This is a three zone arrangement, the intermediate zone being provided by the combined grooves of the two sheets which come together. These are shown at 121; and they may, if desired, be either partially or fully filled with such material as glass-wool or the like, as shown.

In place of such material as glass-wool within the longitudinally extending grooves of certain forms previously illustrated, there may be placed longitudinally extending wires or other partial fillers in said grooves to aid in control of movement of the separating material therein.

In Figures 23 to 28, inclusive, I have shown another arrangement of separator embodying my present invention, and in which provision has been made for introducing two or more reagents or components of a chemical reaction which it is desired to bring about, and from which there are produced two or more liquid end products of different specific gravities. There are many processes wherein such end products are either of a non-stable nature or tend to inter-react for production of secondary end products unless said primary end products are promptly separated from each other. In such cases it is desired to make provision for bringing the original reagents together under conditions such that the primary end products may be promptly controlled and separated. The arrangements shown in Figures 23 to 28 are such that the primary reagents may be introduced through separate ducts which reach directly to the inlet or inlets to the rotor of the separator, so that said primary reagents are kept from reaction with each other until their introduction into the separator rotor. Therein they are brought together and undergo reaction with production of the desired primary end products of differing specific gravities. These are immediately subjected to the centrifugal action in the rotor, and are therefore separated promptly, and prior to further secondary reactions.

In Figures 23, 24, 25, 26 and 27 the shaft element 122 is provided with three concentric passages 123, 124 and 125 reaching downwardly from top cones or funnel shaped receivers 126, 127 and 128, respectively. This arrangement is therefore capable of handling reactions involving not more than three reagents. These passages 123, 124 and 125 extend down far enough to deliver their several reagents to levels where they may be transferred radially into the rotor for treatment and for bringing them together for reaction, and thereafter for separation. Extending radially from these passages are the three radial tubes 129, 130 and 131 which are individualized to these respective passages. These tubes are preferably located at positions 120 degrees from each other around the shaft, and the inner ends of these tubes thus communicate with the inner or axial end of the spiral passage 76 at locations which are close to the inwardly facing convolution (see Figure 27), near the middle of the spiral passage (see Figure 26), and close to the outwardly facing convolution (see Figure 25). Thus, these tubes deliver their reagents into the spiral passage, and at different portions of said passage. These reagents are thus brought together within the spiral passage, where the primary reactions occur; and as the materials travel along such spiral passage this primary reaction continues to completion, producing the primary end products which it is desired to separate and recover. Due to the differing specific gravities of these primary end products they are separated from each other as fast as they are produced within the spiral passage, and due to such separation by centrifugal action they assume their proper zones within the spiral passage and continue travel along such passage in such separated condition. Due to such separation from each other the danger of secondary reactions is eliminated or greatly reduced, and the desired primary end products are delivered from the rotor in the manner already explained.

Sometimes it may be desirable to promote the reactions just referred to by use of catalysts or the like. I have therefore shown one or more of the wires 132 in Figure 28 as comprising platinum or the like, or other catalyst; these wires 132 being some of the wires or materials which are built into the spiral passage according to the principles already described.

In the arrangement shown in Figures 19, 21 and 22 the holes formed in the grooves of the sheets 109—110, 115, and 119—120 permit movement of the material through said sheets. In some cases it may be found satisfactory to cut said sheets lengthwise, that is, to provide two or more narrower sheets extending along the length of the spiral passage, in which case there will be narrow slots or openings between such narrow sheets, and through which the material may move radially. In such cases it may be found unnecessary to provide the holes in the sheets as illustrated.

Referring again to Figures 8 and 9 in particular, and also to Figure 4, the dashed lines 78 and 79 generally define the zones of separation of material by centrifugal action. It has now been shown that in reality these lines do not define impermeable sheets, but rather zones within the body of the liquid undergoing treatment. It has also been shown that during the separating action there is movement of material through the surfaces defined by these dashed lines 78 and 79, so that any sub-partitions actually established at these dashed lines should be permeable, and not impervious to liquid movement through such sub-partitions. Accordingly, the sheets 84 and 86 of Figure 10, the sheets 88 and 89 of Figure 11, and corresponding sheets of Figure 12, and corresponding sheets of Figure 13, and the sheets 98 and 99 of Figure 17, and the sheets 104, 105 and 106 of Figure 18, and the sheets or plates 109 and 110 of Figure 19, and the sheet 115 of Figure 21, and the sheets 119 and 120 of Figure 22, are all shown as provided with the holes to permit radial movement of material, and similar effects are provided for by the screenings 84 and 86 of Figure 10, already referred to.

Such perviousness in these sub-partitions should be provided for along such portion of the length of the spiral passage as may be necessary to ensure complete separation by centrifugal action, but when such separation has been completed it is no longer necessary to allow for such radial movements of material. Furthermore, such completeness of separation has been effected prior to the time that each zone of separation arrives at the outer enclosure or shell 38 of the rotor. Also, as the separated material reaches positions close to the outer shell 38 and shortly before discharge from the rotor, it is desirable to make provision for preventing any intermixing of the separated components thereafter, while at the same time allowing for the free discharge of such components through the several nozzles 67ª, 67ᵇ, and 67ᶜ. Accordingly each of such pervious sheets or partitions is made impervious to radial movement of material through it when a position close to the outer shell 38 is reached but sufficiently far back from the location of the nozzles to prevent improper radial movement after complete separation. Thus, in Figure 4 the sub-partition 79 is shown as being imperforate past the point shown by the dot 133, and the sub-partition 78 is shown as being impervious past the point shown by the dot 134; such impermeability being indicated in each case by the fact that said sub-partitions are shown by full lines past the locations of such dots. The impermeability of the sub-partition 79 beyond the location of the dot 133 will prevent outward radial movement from the intermediate zone to the outer zone beyond the location of that dot; and the impermeability of the sub-partition 78 beyond the location of the dot 134 will prevent outward radial movement from the inner zone to the intermediate zone beyond the location of that dot. Thus there will be assurance of proper delivery of material of intended specific gravity by each zone to its delivery nozzle, and substantially without improper late mixing of material of non-intended specific gravity therewith.

It would be expected that even under the most favorable conditions any separator could not effect absolutely complete separation of the constituents from each other, but it is of course an object to approximate such complete separation. The separators herein disclosed will make possible a very close approximation to such complete separation. Nevertheless, the material delivered from each of the separating zones will carry with it a small proportion of non-separated material. The degree of completeness of separation may be increased by passing the separated material from a selected zone, for example the heavy material zone, through subsequent separators for further refinement. In order to make possible still more perfect separation within a single separator, recourse may be had to the arrangement shown schematically in Figure 29 to which reference is now made:

In Figure 29 a section of the spiral passage is shown in "developed" form, that is, in straight line instead of curvilinear. This is the passage shown by the bracket 76, and it is of course defined by the inner and outer convolutions 77ª and 77ᵇ of the spiral partition 77 as previously explained. Within the passage section shown in Figure 29 I provide a series of sub-partitions 135, 136, 137, etc., each of which includes the leading portion (135ª, 136ª, 137ª, etc.), and the trailing portion (135ᵇ, 136ᵇ, 137ᵇ, etc.), each leading and trailing portion of a sub-partition being connected together by the central portion (135ᶜ, 136ᶜ, 137ᶜ, etc.), as shown. These sub-partitions are so formed that the leading portion (a) of each sub-partition overlies the trailing portion (b) of the sub-partition next in line in the direction of material movement along the spiral passage, and the connecting portion (c) of each sub-partition is so located that material trapped by a leading portion (a) will be caused to move inwardly, towards the convolution 77ª, that is, towards the lighter component location. The non-trapped material, that is, the heavy material component lying outwardly of such leading portion (a) of a sub-partition, will be retained in its location close to the outer convolution 77ᵇ where it belongs. As the material proceeds along the spiral passage in the direction indicated by the arrow 138 in Figure 29 there has been a separating action prior to the time such material reaches the sub-partition 135, so that the heavier component approaching such sub-partition will be travelling relatively close to the convolution 77ᵇ, the lighter material component travelling relatively close to the convolution 77ᵃ. When the sub-partition 135 is reached such lighter component will be retained at its position close to the convolution 77ᵃ; and the heavier component material, lying to the outward face of the sub-partition 135 will occupy all the space between such sub-partition and the convolution 77ᵇ. As such heavier component material moves to the connecting portion 135ᶜ it will suffer a further separating action, the lighter portions of such "heavier component" moving inwardly to locations of less radius, and the heavier portion of such "heavier component" remaining at the locations of larger radius (measured from the axis of rotor rotation). Such lighter portions will thereafter be trapped by the leading portion 136ᵃ of the next sub-partition, 136, being caught against the inner face of the said leading portion 136ᵃ, and the heavier portions will still remain outwardly of such sub-partition 136 where they rightfully belong. As the material continues its travel towards the right in Figure 29 it will suffer further refinements as succeeding sub-partitions are encountered and passed, so that a "stage" refining effect will be produced along the length of passage 76 wherein such sub-partitions are located.

Generally such sub-partitions as 135, 136, and 137, should be of impervious material, so that intermingling of material through them cannot occur. Generally, also, such sub-partitions as 135, 136, and 137 will be located in the later portions of the spiral passage, that is, in the last or outer convolution thereof, for example, so that after the preliminary separation has been effected by travel through some of the convolutions of the spiral passage, refining action may then be produced by the action of such sub-partitions as 135, 136, and 137. Thus, these refining sub-partitions may be located at the positions beyond the dot 133ᵃ in Figure 32, in place of the continuous pervious sub-partition shown in that figure. Thereby, as the heavier separated material encounters the last convolutions of the spiral passage it will be subjected to such a "stage" final refining separation as will be produced by these sub-partitions.

Reference may be had to the characteristic curves of Figure 30. For a better understanding of these curves and their significance, reference may also be had to the spiral form of passage shown in Figure 4. If that spiral passage be considered as consisting of successive sections, each 120 degrees arcuate embracement, these sections may be shown as the "Successive Sections of Spiral Passage" shown at the bottom of Figure 30. These sections become successively longer as the passage is traversed due to increasing radius of that passage (measured from the axis of rotation). It is assumed, in plotting Figure 30 curves, that the spiral passage is of uniform cross-section, so that the linear velocity of material travelling along such passage is uniform. Under these conditions, the time to traverse each of the "Successive Sections" will be proportionate to the length thereof. These lengths will regularly increase according to arithmetical progression, since they are proportionate to average radii of the said successive sections. If the time to traverse the first section (namely, that one at the inner end of the spiral passage) be assumed as unity, then a curve showing the time intervals to traverse successive sections will be linear, passing through (1) for the first section, and rising in time values as succeeding sections are traversed until the outer or delivery end of the passage is reached. These facts are shown by the straight line curve 138 in Figure 30.

The centrifugal effect at any given radius of the spiral passage is proportional to the value of the radius of the passage at that point where such centrifugal effect is considered. Thus:

$$F = M\frac{v^2}{r}$$

or, $$F = M\frac{(2\pi r N)^2}{r}$$

where, F is the centrifugal effect, M is the mass of the body being acted upon, N is the speed of rotation in revolutions per second, and r is the radius of rotation. This equation resolves to the following:

$$F = M \times 39.44 rN$$

It is thus evident that the centrifugal effect is increasing in the spiral passage as increased radii of the spiral passage are encountered. This fact is shown by the curve 139 in Figure 30 which extends in linear fashion upwardly as successive passage sections are traversed.

The "separating effectiveness" which will be produced within the body of material traversing each section of the spiral passage will be proportionate to the centrifugal effect in that section multiplied by the time interval during which the material remains subject to that centrifugal effect. The curve 140 of Figure 30 shows this effect. From this curve it is seen that a very pronounced increase of separating effectiveness is experienced in the later stages of travel along the spiral passage, due to the product of the increase of both the time interval and the centrifugal effect as successive sections of the passage are traversed. Thus, the increased stubbornness of the material to resist separation of the final unseparated portions of components is largely if not completely offset by the improved separating effectiveness in the sections of spiral passage then being traversed.

In Figures 31 and 32 I have shown a modified embodiment of separator incorporating features of the present invention. This embodiment includes the rotor element 141 carried by the rather long, slightly flexible, tapered shaft element 142 which is journalled in the bearings 143 and 144 carried by any suitable carrier or frame, shown at 146 and 147, schematically. This rotor element includes the body portion 148 of U-shaped cross-section, similar to the element 33 previously disclosed, and the surrounding band 149 to close the outer periphery of such U-shaped element 148. Conveniently this band may be welded or soldered or brazed to the outer edges of the U-shaped element, as shown by the welds 150. This U-shaped element is provided with the spirally extending impervious partition 151 extending between the flanges 152 and 153 of the U-shaped element, and, if desired, with the sub-partitions o rother elements such as shown at 154 in Figures 31 and 32, according to the principles hereinbefore explained. Such spiral passage may also be provided with "stage" sub-partitions or the like such as shown in Figure 29, and already described.

In the arrangement shown in Figures 31 and 32 the shaft element 142 includes the inlet end portion 155 and the delivery end portion 156. Both of these portions are preferably sufficiently flexible to permit slight accommodations of the central portion 141, to enable the entire rotating unit to adjust itself to dynamic unbalance when a very high speed of rotation is reached, so that at that and higher speeds the rotating element will be able to rotate around its dynamic axis of rotation, according to well understood principles, and thus providing a rotor of the general form well known in such high speed units as the so-called DeLaval turbine.

The inlet shaft portion 155 is provided with a longitudinally extending bore 157 reaching through the bearing 143 and to the radial openings 158 within the body of the rotor. These openings 158 communicate with the space 159 between the shaft proper and the hub portion 160 of the U-shaped element; and said hub portion is provided with the radial openings 161 through which the untreated material is supplied to the inner end of the spiral passage in manner similar to the arrangement shown in Figures 1 to 9, inclusive.

The supply end of the passage 157 is provided with the radial openings 162, and a stationary sleeve 163 surrounds this end portion of the shaft, this sleeve being provided with the encircling groove 164 to which untreated material is supplied through the line 165. The sleeve 163 makes a substantially liquid tight joint with the rotating shaft so as to reduce or eliminate leakage at this point. Liquid is supplied to the line 165 by a pump or in other suitable manner, 166, from the supply tank 167; and a supply control valve 168 is provided in the line 165 for control of the rate of supply of the untreated material to the separating unit.

Extending radially within the flange 153 of the U-shaped element are the two passages 169 and 170, these being located diametrically opposite to each other. The outer ends of these passages communicate with the outer end portion of the spiral passage by the somewhat circumferentially enlarged openings 171 and 172, best shown in Figure 32. Examination of Figure 32 will show that the opening 171 communicates with the spiral passage close to the outer wall of that passage, and therefore such opening 171 will receive the heavier component of separated material from the spiral passage. Contrarily, the opening 172 communicates with the spiral passage close to the inner wall of that passage, and therefore such opening 172 will receive the lighter component of separated material from the spiral passage.

The outlet shaft portion 156 is provided with the two longitudinally extending bores 173 and 174 reaching from the radial passages 169 and 170, respectively, through the bearing 144; and beyond such bearing these bores 173 and 174 communicate with the radial delivery openings 175 and 176, respectively. Surrounding the shaft and around these opening positions are the two sleeves 177 and 178 which are provided with the encircling grooves 179 and 180. Thus material arriving from the passages 173 and 174 is separately delivered to the two grooves 179 and 180. These grooves deliver their respective separated components over the lines 181 and 182, respectively, the line 181 carrying the heavier component, and the line 182 carrying the lighter component. These lines deliver their components to the receiving tanks 183 and 184 under control of the valves 185 and 186, respectively. By control of these valves it is possible to adjust the rates of delivery of the heavier and lighter components, respectively, so that proper balance is secured, and corresponding to the ratio which these components bear to each other. It is also possible, by control of these valves to ensure complete fillage of all the passages throughout the system when in operation, while at the same time allowing delivery of the proper proportions of separated components.

It will be noted that in Figure 32 I have also shown the lines 181 and 182 as connected to the waste lines 187 and 188 which are provided with the control valves 189 and 190. These waste connections and valves are useful in bringing the separator into operation and with complete elimination of all entrapped air, as will be presently explained.

With the arrangement shown in Figures 31 and 32 the material is supplied by the pump 166 under such amount of pressure as may be required to move the material through the system at the desired rate of travel. Assuming that all air has been eliminated from the system, as the material moves from the passage 157 and into the spiral passage it rapidly becomes subjected to the centrifugal action, and to high pressures. As the material travels slowly along the spiral passage its centrifugal pressure increases to a maximum when the periphery of the rotor is reached, namely, the outer or delivery end of the spiral passage. There the two separated components are delivered through the openings 171 and 172 to the radial inwardly extending passages 169 and 170, and as the material moves inwardly to positions of smaller and smaller radius its resisting centrifugal pressure decreases until the axially extending passages 173 and 174 are reached. Within these passages the centrifugal pressure has been reduced to zero or to a small value dependent on the small radial distance of such passages from the axis of rotation. The material flowing along these passages is delivered to the lines 181 and 182 and thence past the control valves 185 and 186 to the receiving tanks or receptacles 183 and 184.

It is seen that although large outwardly acting centrifugal forces are developed within the passages 169 and 170, being in fact equal to the full centrifugal forces developed elsewhere in the system, still these forces are balanced by the centrifugal forces developed within the body of the rotor itself. In other words, as the material moves outwardly along the spiral passage the centrifugal force builds up in the material, and then, as the material moves inwardly through the passages 169 and 170 a balance of forces is created. For this reason it is only necessary to develop a supply pressure by the pump 166 of amount sufficient to actually move the material through the system, plus such additional pressure as may be desired or proper to ensure proper control of flows by the use of the valves 168, 185 and 186.

It will be understood that generally the unit shown in Figures 31 and 32 will be set up and operated with its shaft extending vertically. In such case the material flows in a generally downward direction when the rotor is in operation. When the unit is to be brought into operation, assuming that it has been idle, or that a change of material is contemplated, untreated material will be supplied through the line 165 from the pump 166, the rotor being either idle or rotating relatively slowly. As the material flows down into the rotor it will displace some air from the system, and as it flows outwardly through the spiral passage the air will be driven forward to the openings 171 and 172 and then on down through the passages 173 and 174 and out through the lines 181 and 182. By supplying material slowly through the system with the rotor rotating slowly it will be possible to finally expel all of the air from the system so that all passages will be completely filled with material to be treated. When that condition is attained the rotor may be gradually brought up to speed, and any further slight amounts of entrapped air remaining in the system will be rapidly delivered out through the lines 181 and 182, due to the high pressures developed at high speeds of operation, which high pressures will serve to greatly assist elimination of such remaining traces of entrapped air.

During this preliminary starting operation the valves 189 and 190 may be opened to such extent as may ensure the desired starting functions, such material as flows out during the start being delivered to the waste lines 187 and 188. As the system is brought into regular operation, the valves 185 and 186 may be gradually opened while the valves 189 and 190 are correspondingly closed, until finally the system has been brought into regular operation. The valve 168 may also be properly adjusted during these operations.

If desired the system might be inverted, introducing the untreated material from below, and delivering the separated components at the top, in which case, of course, the passage 157 and connections thereto would be in the lower shaft section, and the passages 173 and 174 would be in the upper shaft section with proper connections thereto.

In case it is desired to heat the rotor and the material undergoing treatment in order to reduce or control the viscosity of such material or for other purposes, any suitable heating means may be provided for such purposes. In Figure 31 I have shown schematically the coil 191 surrounding the body of the rotor, and the terminals 192 and 193 of this coil may be connected to a suitable source of supply of alternating current of proper frequency for the heating effect to be produced. The alternating flux delivered by such alternating current flowing through this coil 191 will generate eddy currents in the metals of which the rotor is built; and in case any of such metals are of a magnetic nature these alternating currents will also ensure the generation of hysteresis losses in the magnetic metals of the rotor. The heating effects of these eddy currents (and hysteresis losses, if any) will be controllable by control of frequency and magnitude of the current flowed through the coil 191, and thus the heating effect may be such as to produce the desired temperature in the materials undergoing treatment in the rotor.

The development of very great centrifugal actions, and very high values of "G" is contemplated in the arrangements herein disclosed. In fact it is contemplated that values of "G" well in excess of 100,000, and probably as high as several hundred thousand "G" will be developed. Such great values of "G" will represent, also, very high hydrostatic pressures within the rotor, and will also require very high rotative speeds of the rotor. In fact speeds of 30,000–60,000 R. P. M., and in excess, with rotor diameters of four to six inches will be contemplated. The hydrostatic pressures will also be of the order of 50,000–100,000 p. s. i. and higher. In order to meet the onerous conditions imposed by such operations it is necessary to make provision for meeting these very high hydrostatic pressures without leakage, and also to make provision for very high tensile stresses in the rotor elements. Such stresses will be due both to the metallic mass of the parts of such rotor, and also to the internal pressures developed therein, especially in the portions of larger radius.

Referring especially to Figure 31 it will be noted that the two flanges or side walls 152 and 153 are integrally connected to the hub portion 160. These side walls are subjected to large lateral forces due to the internal pressures within the rotor; and are also subjected to large centrifugal forces developed within their metals due to high rotative speeds. I have therefore shown these side walls as being of tapered form, thickest in their base sections close to the hub element 160, and tapering in thickness in their larger radius portions. Their inner or opposing faces are, however, planar and normal to the axis of rotation. This form of these side walls will take care of the combinations of stresses to which they are subjected in service to best advantage. It is noted, also, that since these side walls are both connected to and integral with the hub portion, the lateral forces generated on these side walls by internal hydrostatic pressures will be directly transmitted to the hub portion, and there balanced.

The outer or open periphery of the U-shaped opening of the rotor is enclosed by the surrounding ring closure 149 corresponding to the like closure in the embodiment shown in Figures 1 to 9, inclusive. This ring enclosure must meet the very great bursting force generated in its body by reason of the high rate of rotation; and must also meet the great hydrostatic pressure generated against it by the fluid material being treated. Such hydrostatic pressure will also tend to cause leakage between this ring element 149 and the peripheral edge portions of the flanges 152 and 153. I have shown the ring element as being welded or brazed or otherwise connected to these flanges or side walls, as shown at 150 in Figure 31. Conveniently the ring 149 may be made slightly undersize as compared to the peripheries of the flanges 152 and 153, and by greatly cooling the body of the rotor, as by the use of Dry-Ice (solid $CO_2$), it is possible to contract the flanges sufficiently to enable the ring element to be set into place over the flanges. Thereafter the ring may be welded to the flanges as shown in Figure 31, taking care to avoid raising the temperature of the body of the rotor sufficiently (at points away from the points of weld) to damage the contained partitions or other material, such as glass wool, etc., which may be contained within the spiral passage. It will be understood, in this connection, that said spirally extending partition, as well as any sub-partitions, glass wool, etc., contained within the spirally extending passage will have been set into the rotor prior to placing the ring element 149 thereon. In place of cooling the body of the rotor as above explained, the ring element might be expanded by heating the same prior to setting it into place on the rotor flanges, and in such case, also, care should be exercised not to heat the body of the rotor excessively, for reasons already explained.

Referring to Figure 2, it will be seen that the bore 39 of the shaft element 31 is of tapered size in its upper portion 194, tapering from smaller to larger size from top to bottom. There is also shown the material supply line 195 leading down into this passage a convenient distance to ensure good delivery of supplied material into the passage, but without necessary seal of the line 195 with the shaft element 31. This arrangement will permit smooth running of the rotor, regardless of exact centering of the supply line; and the taper of the bore 194 will ensure that as soon as material enters such bore it will be thrown by centrifugal force against the wall of the bore, and outwardly through the openings 41 into the space 35 for feed to the inner end portion of the spiral passage.

I have emphasized the application of controlled heating action to the rotor when in operation, for the purpose of controlling viscosity of the material being treated. There will also sometimes arise operations in which controlled heating of the material being treated will be desirable for other purposes than mere control of viscosity, but without impairment of the centrifugal separating action, and without damage to material being treated. For example, it may sometimes be desired to heat the material to promote or expedite chemical reactions proceeding within the rotor or just prior to movement of such materials into the spiral passage, and which are then to be subjected to the separating action, by centrifugal force.

It is pointed out that when using an embodiment such as that shown in Figures 31 and 32 there will be produced in the groove 164 at the inlet end of the system a centrifugal force proportional to the diameter of the shaft at the position of that groove. Any such centrifugal force must be overcome by the pressure of the material as supplied over the line 165 by the pump 166 to ensure continuous supply of the fresh material to the rotor. It is also noted that various special forms of seal may be provided for ensuring liquid seal between the stationary ring elements 163, 177, and 178 and the shaft sections extending through such ring elements, due to the very high speeds of rotation used; but the details of such seals, when used are optional with the designer. It is also noted that in the arrangement shown in Figures 31 and 32 the body of the rotor, 141, is clamped between the shaft flange 194 and the clamping nut 195 in manner similar to the arrangement disclosed in connection with the embodiment shown in Figures 1 to 9, inclusive.

The rotor element 141 of the embodiment shown in Figures 31 and 32 may be driven in any suitable manner, generally by connection to the lower end 196 of the shaft section 156. Such drive may be by pulley and belt, spiral gear connection, air blast, or other suitable driving means consistent with the high rotative speeds required. This is true also of the embodiment shown in Figures 1 to 9, inclusive.

The rate of linear travel of the material through the spiral passage is very small in comparison to the peripheral velocity of the outer or delivery end of that passage due to rotation of the rotor. Furthermore, the spiral passage is of relatively small pitch, that is, the magnitude of radial advancement of such passage in comparison to angular movement is small. For example, in the embodiment shown in Figure 4 there are approximately five convolutions, a total of 1800 degrees of angular movement, and the increase of radius is of the order of 1 inch. In that embodiment the total length of the spiral passage is approximately 55 inches, and the increase of radius is of the order of 1 inch. Thus the angle of the spiral is of the order of 1/55, or 0.0182, and the angle is of the order of 1 degree, 3 minutes. Therefore the movement of the material through this passage is equivalent to movement upwardly along a plane set at 1 degree, 3 inches to the horizontal.

Referring to Figure 4, a particle of material, 197 may be considered as subject to a tangential velocity equal to the tangential velocity of the passage at the position of that particle, as shown by the line 198. The backward movement of the particle along the passage may be shown by the line 199 which lies parallel to the direction of the passage at the location of that particle, so that the angle $a$ is substantially 1 degree, 3 minutes. The net velocity of the particle is then shown by the length of the resultant line 200, and the resultant direction of movement is shown by the direction of that resultant line. Since the backward component, 199 is very small in comparison to the tangential or rotor velocity, it follows that substantially the entire tangential or centrifugal velocity is available for production of centrifugal pressure within the passage, so that the separating action is a maximum. In other words, the rate of flow of material along the passage is purposely made very small in comparison to the tangential velocity of the rotor at the delivery end thereof, so that practically the entire amount of such tangential rotor velocity is available for production of centrifugal force on the material being treated, with a maximum of separating efficiency. On the opening of the control valves 185 and 186 of Figure 32 to full extent, or use of nozzles of maximum intended delivery orifice sizes in Figures 2, 3, 4, 5, 6 and 7, the rate of linear flow through the spiral passage will be very small in comparison to the tangential velocity, so that practically the full value of said tangential velocity is available for separating action, even when operating the separator under normal conditions of maximum intended rate of material treatment. In the vector diagram 198, 199, 200, of Figure 4, the value of the component 199 (rate of flow linearly through the spiral passage) is shown greatly exaggerated as compared to the value of the component 198, for purposes of better illustration. Actually the resultant value, as shown by the length of the line 200 will be approximately as great as the value shown by the length of the line 198.

If it should be desired to cool the material undergoing treatment, for purposes of better control of the separating treatment, a tubular coil may be substituted for the electrical current coil 191 in Figure 31, and cooling medium may be circulated through such tubular coil to hold the material being treated to the proper temperature.

I claim:

1. In a centrifugal separator a cylindrical rotor of substantially uniform diameter throughout its length, means to journal said rotor for rotation about an axis concentric with the axis of said rotor, an impervious partition within said rotor extending lengthwise from end to end of said rotor and extending in spiral form from an inlet position at a small radius and located close to the axis of rotation to a discharge position at larger radius and located at the periphery of said rotor, the successive convolutions of said partition being separated from each other a substantially constant radial distance throughout the spiral length of the partition to provide a spiral passage of substantially uniform radial dimension extending throughout the rotor from said inlet location to said peripheral discharge location for flow of material undergoing treatment through said spiral passage under centrifugal action produced by the rotation of the rotor, means to introduce into said spiral passage material to be treated, at said inlet location, said introducing means being in connection with said inlet location of the spiral passage, spacing elements within the spiral passage and extending radially from each convolution of the spiral partition to the adjacent convolution of said partition to retain said convolutions at fixed spacing from each other, said spacing elements including foraminated layers extending lengthwise of the spiral passage and across the width of the passage in direction parallel to the axis of rotor rotation, said foraminated layers including radially extending portions extending in radial fashion between the outwardly facing surface of the convolution of smaller radius and the inwardly facing surface of the adjacent convolution of next larger radius, to thereby retain the consecutive convolutions of the partition at fixed spacings from each other, and the foraminations of said layers permitting interchange of material radially through the layers during separation actions produced in the spiral passage by centrifugal forces developed by rotation of the rotor, means to separately deliver separated material components from the discharge location, said delivering means comprising at least two discharge elements one of which is in communication with the small radius portion of the spiral passage at the discharge location and the other of which is in communication with the large radius portion of the spiral passage at the discharge location, and means to separately collect material delivered from each of said separate delivery means.

2. Means as defined in claim 1 in which said spacing elements comprise perforated sheets extending in spiral form lengthwise of the spiral passage, together with wires located between said perforated sheets and the adjacent convolutions of the impervious partition and serving to retain the perforated sheets in fixed spacing from the adjacent convolutions and to retain the adjacent convolutions at fixed spacing from each other.

3. Means as defined in claim 1 in which said spacing elements comprise corrugated sheets located within the spiral passage and extending lengthwise thereof, said corrugated sheets being provided with perforations for radial movement of liquid therethrough, and said sheets being in engagement with each other and with the adjacent convolutions of the impervious partition to thereby retain said convolutions at fixed spacing from each other.

4. Means as defined in claim 1 in which said spacing elements comprise grooved sheets located within the spiral passage and extending lengthwise thereof, said sheets being provided with perforations for radial movement of liquid therethrough, and said sheets being in engagement with the adjacent convolutions of the impervious partition to thereby retain said convolutions at fixed spacing from each other.

5. In a centrifugal separator a cylindrical rotor, means to journal said rotor for rotation about an axis concentric with the axis of said rotor, an impervious partition within said rotor extending in spiral form from an inlet location close to the axis of rotation to a discharge location at the periphery of said rotor, the successive convolutions of said partition being separated from each other a substantially constant radial distance throughout the spiral length of the partition to provide a spiral passage of substantially uniform radial dimension extending throughout the rotor from said inlet location to said peripheral discharge location for flow of material undergoing treatment through said spiral passage under centrifugal action produced by the rotation of the rotor, means to introduce into said spiral passage material to be treated, at said inlet location, said introducing means being in connection with said inlet location of the spiral passage, means to separately deliver separated material components from the discharge location, said delivering means comprising at least two discharge passages carried by the rotor and extending radially inwardly towards the axis of rotation, a liquid tight connection from the outer end portion of one passage to the outer end portion of the spiral passage at a position close to the small radius portion of said outer end of the spiral passage, a liquid tight connection from the outer end portion of the other passage to the outer end portion of the spiral passage at a position close to the large radius portion of said outer end of the spiral passage, and means to separately collect material components flowing from the inner ends of said two passages.

6. A structure as defined in claim 5 wherein said collecting means includes stationary conduits corresponding to said inwardly extending passages of the rotor, together with liquid tight slip connections between the inwardly extending passages and said stationary conduits.

7. A structure as defined in claim 6, together with valve means in said stationary conduits to separately control the stream of component flowing through said conduits.

8. In a centrifugal separator a cylindrical rotor, means to journal said rotor for rotation about an axis concentric with the axis of said rotor, an impervious partition within said rotor extending in spiral form from an inlet location close to the axis of rotation to a discharge location at the periphery of said rotor, the successive convolutions of said partition being separated from each other a substantially constant radial distance throughout the spiral length of the partition to provide a spiral passage of substantially uniform radial dimension extending throughout the rotor from said inlet location to said peripheral discharge location for flow of material undergoing treatment through said spiral passage under centrifugal action produced by the rotation of the rotor, means to introduce into said spiral passage material to be treated, at said inlet location, said introducing means being in connection with said inlet location of the spiral passage, means to separately deliver separated material components from the discharge location, said delivering means comprising at least two discharge elements one of which is in communication with the small radius portion of the spiral passage at the discharge location and the other of which is in communication with the large radius portion of the spiral passage at the discharge location, and means to separately collect material delivered from each of said separate delivery means, together with means in the outer portion of the spiral passage to refine the separation of said material components comprising a series of sub-partitions extending lengthwise of said spiral passage, the leading end of each sub-partition being located within the spiral passage at a less radius from the axis of rotation than the trailing end of the preceding sub-partition, and the trailing end of each sub-partition overlapping the leading end of the succeeding sub-partition and being separated therefrom radially to permit movement of liquid advancing through the spiral passage to the location of said sub-partitions to divide at the position of the trailing end of each sub-partition with movement of lighter component toward smaller radius location within the spiral passage and along the inner face of such sub-partition, and with movement of heavier component toward larger radius location within the spiral passage and along the outer face of such sub-partition, said sub-partitions being located within the spiral passage at a location in advance of the connection of the delivering means to the large radius portion of the spiral passage.

9. A structure as defined in claim 8, together with means to close the spiral passage in that portion thereof outwardly of the leading sub-partition at a point in advance of the connection of the delivering means to the large radius portion of the spiral passage.

10. In a centrifuge a cylindrical rotor of substantially uniform diameter throughout its length, radially extending end walls at the ends of said rotor, an impervious partition within the body of said rotor, said partition extending lengthwise of the rotor between said end walls and spiralling outwardly from an inlet location of small radius to an outlet location of larger radius to establish a spirally extending main passage within the rotor, together with foraminated means within said main passage and extending along the main passage in the direction of its spiral to subdivide said main passage into larger and smaller radius sub-passages located within the main passage and extending lengthwise of the spiral main passage and embraced between consecutive convolutions of the impervious partition aforesaid, the foraminated means being provided with numerous radially extending openings distributed along said foraminated means lengthwise of the main passage and establishing communication through said foraminated means between the larger radius and the smaller radius sub-passages at various points along the spiral length of the main passage to permit interchange of materials through said openings of the foraminated means under centrifugal action at various points along the spiral length of the main passage.

11. In a rotor having an axis of rotation and having a spirally extending main passage extending in spiral fashion from a small radius inner inlet end to a larger radius outer and delivery end, a series of sub-partitions in the body of said spiral main passage and extending lengthwise thereof to subdivide the main passage into inner and outer sub-passages at the location of said sub-partitions, the leading end portion of one sub-partition and the trailing end portion of an adjacent sub-partition being at different radial locations from the axis of rotor rotation and separated from each other radially of the rotor, and overlapping each other to thereby direct material flowing along the main spiral passage from the inlet to the outlet thereof from one sub-passage to the other sub-passage of the main passage.

12. In a centrifuge a cylindrical rotor of substantially uniform diameter throughout its length, radially extending end walls at the ends of said rotor, means to journal said rotor for rotation on its cylindrical axis, means within the body of said rotor providing a circling main passage within the body of the rotor circling said rotor and extending between said end walls, said means within the body of said rotor providing impervious inner and outer enclosing surfaces of said circling main passage, an inlet connection to said main passage at one end thereof and communicating with said passage at a location of small radius measured from the axis of cylinder rotation, outlet connections from said passage adjacent to the other end thereof, at least one of said outlet connections communicating with said passage at a location of radius, measured from the axis of cylinder rotation, greater than the radius of the inlet connection aforesaid, together with foraminated means within said main passage and extending along the main passage in circling direction within the rotor to subdivide said main passage into larger and smaller radius subpassages located within the main passage and extending along the main passage in its circling direction and embraced between said impervious inner and outer enclosing surfaces, said foraminated means being provided with numerous radially extending openings distributed along said foraminated means lengthwise of the main passage and establishing communication through said foraminated means between the larger radius and the smaller radius subpassages at various points along the circling path of the main passage to permit interchange of materials through said openings of the foraminated means under centrifugal action at various points along the circling length of the main passage.

13. Means as defined in claim 12 in which said foraminated means comprises perforated sheets extending lengthwise of the main passage, together with wires located between said perforated sheets and the adjacent enclosing surfaces of the main passage and serving to retain the perforated sheets in fixed spacing from said enclosing surfaces and to retain the enclosing surfaces at fixed spacing from each other.

14. Means as defined in claim 12 in which said foraminated means comprises corrugated sheets located within the main passage and extending lengthwise thereof, said corrugated sheets being provided with perforations for radial movement of liquid therethrough, and said sheets being in engagement with each other and with the adjacent enclosing surfaces of the main passage to thereby retain said enclosing surfaces at fixed spacing from each other.

15. Means as defined in claim 12 in which said foraminated means comprises grooved sheets located within the main passage and extending lengthwise thereof, said sheets being provided with perforations for radial movement of liquid therethrough, and said sheets being in engagement with the adjacent enclosing surfaces of the main passage to thereby retain said enclosing surfaces at fixed spacing from each other.

16. A structure as defined in claim 12 together with separate delivery passages carried by the rotor and extending radially inwardly from the outlet connections to delivery locations close to the axis of rotor rotation.

17. A structure as defined in claim 16, together with a stationary conduit in communication with each inwardly extending delivery passage, and a liquid tight slip connection between each delivery passage and the corresponding stationary conduit.

18. A structure as defined in claim 16, together with valve means in connection with a delivery passage to control the stream of component flowing through such delivery passage.

EMIL L. RANSEEN.

REFERENCES CITED

The following references are of record in the file of this patent:

UNITED STATES PATENTS

| Number | Name | Date |
|---|---|---|
| 646,182 | Laidlaw | Mar. 27, 1900 |
| 703,630 | Ten Winkel | July 1, 1902 |
| 893,299 | Bellany | July 14, 1903 |
| 974,075 | King | Oct. 25, 1910 |
| 1,417,064 | Holmgren | May 23, 1922 |
| 1,472,085 | Philip | Oct. 30, 1923 |
| 2,485,209 | Lundal | Oct. 18, 1949 |